United States Patent
Ikeda et al.

(10) Patent No.: US 7,832,211 B2
(45) Date of Patent: Nov. 16, 2010

(54) GAS TURBINE COMBUSTOR AND A GAS TURBINE EQUIPPED THEREWITH

(75) Inventors: Kazufumi Ikeda, Hyogo (JP); Shigemi Mandai, Hyogo (JP); Yutaka Kawata, Hyogo (JP); Kuniaki Aoyama, Hyogo (JP); Masaki Ono, Hyogo (JP); Katsunori Tanaka, Hyogo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 1235 days.

(21) Appl. No.: 10/525,004

(22) PCT Filed: Nov. 28, 2003

(86) PCT No.: PCT/JP03/15298
§ 371 (c)(1),
(2), (4) Date: Feb. 17, 2005

(87) PCT Pub. No.: WO2004/051063
PCT Pub. Date: Jun. 17, 2004

(65) Prior Publication Data
US 2005/0223707 A1  Oct. 13, 2005

(30) Foreign Application Priority Data

Dec. 2, 2002 (JP) .............................. 2002-349745
Dec. 2, 2002 (JP) .............................. 2002-349753
Dec. 2, 2002 (JP) .............................. 2002-349763
Dec. 2, 2002 (JP) .............................. 2002-349772

(51) Int. Cl.
*F02C 7/24* (2006.01)
*F23M 5/00* (2006.01)

(52) U.S. Cl. ........................................ 60/725; 431/114

(58) Field of Classification Search .................. 60/725, 60/39.37; 181/213, 222, 220; 431/114
See application file for complete search history.

(56) References Cited

U.S. PATENT DOCUMENTS 2,988,302 A * 6/1961 Smith .......................... 244/15

(Continued)

FOREIGN PATENT DOCUMENTS

EP        1213539        6/2002

(Continued)

*Primary Examiner*—Michael Cuff
*Assistant Examiner*—Gerald L Sung
(74) *Attorney, Agent, or Firm*—Wenderoth, Lind & Ponack, L.L.P.

(57) ABSTRACT

In order to realize a stable decrease in NOx, a gas turbine combustor is supplied which can reduce combustion vibration. A combustor (3) is provided with a first box body (30), which is installed outside an object body (20) such as a combustor basket (6), a transition piece (7) or a bypass duct (11) so as to form a first internal space (31) having a predetermined capacity; and a first throat (32) having a predetermined length which has one end (32a) open to a side wall (20a) of the object body (20) and has the other end (32b) open to a first internal space (31); wherein, a first resistive element (33) having a multiple number of through-holes is inserted and engaged to one end (32a). Fluid particles serving as vibration elements of combustion vibration caused in a combustion region are effectively trapped by the first resistive element (33) and at the same time resonate with the air of the first internal space (31) being connected through the first throat (32) and vibrate in the neighborhood of the first resistive element (33), thereby damping vibration amplitude thereof.

8 Claims, 26 Drawing Sheets

U.S. PATENT DOCUMENTS

| | | | |
|---|---|---|---|
| 3,542,152 A * | 11/1970 | Oxx, Jr. et al. | 181/214 |
| 4,135,603 A * | 1/1979 | Dean et al. | 181/286 |
| 4,244,441 A * | 1/1981 | Tolman | 181/213 |
| 5,373,695 A | 12/1994 | Aigner et al. | |
| 5,685,157 A | 11/1997 | Pandalai et al. | |
| 6,305,927 B1 | 10/2001 | Keller | |
| 6,530,221 B1 * | 3/2003 | Sattinger et al. | 60/725 |
| 7,080,514 B2 * | 7/2006 | Bland et al. | 60/725 |
| 7,413,053 B2 * | 8/2008 | Wasif et al. | 181/293 |
| 7,448,215 B2 * | 11/2008 | Macquisten et al. | 60/725 |
| 2002/0066272 A1 * | 6/2002 | Suenaga et al. | 60/725 |

FOREIGN PATENT DOCUMENTS

| | | |
|---|---|---|
| GB | 2288660 | 10/1995 |
| JP | 3-17237 | 2/1991 |
| JP | 4-347312 | 12/1992 |
| JP | 6-221563 | 8/1994 |
| JP | 7-501137 | 2/1995 |
| JP | 7-293885 | 11/1995 |
| JP | 11-141878 | 5/1999 |
| JP | 2000-45793 | 2/2000 |
| JP | 2001-141240 | 5/2001 |
| JP | 3233798 | 9/2001 |
| JP | 2002-174427 | 6/2002 |
| JP | 2002-317650 | 10/2002 |
| JP | 1253378 | 10/2002 |
| WO | 93/10401 | 5/1993 |

\* cited by examiner

GAS TURBINE COMBUSTOR AND A GAS TURBINE EQUIPPED THEREWITH

TECHNICAL FIELD

The present invention relates to a gas turbine combustor (sometimes referred as a "combustor" hereinafter) and a gas turbine equipped with a gas turbine combustor, and especially, relates to a gas turbine combustor and a gas turbine that reduce combustion vibration in order to realize decrease in nitrogen oxides (NOx).

BACKGROUND ART

Conventionally, a gas turbine has an air compressor (sometimes referred as a "compressor" hereinafter), a combustor and a turbine serve as major components, wherein the combustor is installed between the compressor and the turbine that are directly connected to each other by a main shaft; an air serving as a working fluid is inhaled into the compressor by rotation of the main shaft and compressed therein; the compressed air is introduced into the combustor and burned with a fuel; and the high temperature and high pressure combustion gas is exhausted into a turbine so as to rotary-drive the main shaft with the turbine. The gas turbine constructed in such a manner is utilized as a driving source by having a generator and the like connected to the front end of the main shaft, and is also utilized as a jet engine by installing an exhaust port for injection of combustion gas at the front of the turbine.

And now, in recent years, especially reduction of NOx in exhaust gas being discharged from a gas turbine is strongly desired for an environmental issue as one of vital legal regulations. Therefore, a combustor which actually generates NOx especially requires a technology to suppress generation of NOx. In order to achieve this, as a combustion method to be adopted to a combustor, a premixed combustion method has become a main stream, wherein a fuel and compressed air are burned after being mixed preliminarily. In this premixed combustion method, because a fuel disperses uniformly and tenuously in the compressed air, local increase in temperature of combustion flame can be prevented, thereby making it possible to reduce the generation amount of NOx which increases in accordance with an increase in temperature of combustion flame.

Here, a more common gas turbine than conventional to which a combustor using a premixed combustion method is applied will be described by referring to FIG. 47. This gas turbine 1 mainly consists of a compressor 2, a gas turbine combustor 3 and a turbine 4. The combustor 3 is installed to a casing 5 which has a cavity being formed between the compressor 2 and the turbine 4, and consists of a combustor basket 6 which has a combustion region; a transition piece 7 which is connected to the front end of the combustor basket 6; an outer shell 8 which is installed so as to be concentric to the combustor basket 6; a pilot nozzle 9 which is installed on the axis of the combustor basket 6 from the rear end; a plurality of main nozzles 10 which are installed at even intervals in a circumferential direction around the pilot nozzle 9; a bypass duct 11 which opens to the casing 5 being connected to a side wall of the transition piece 7; a bypass valve 12 which is installed to the bypass duct 11; and a bypass-valve variable mechanism 13 which adjusts the degree of opening and closure of the bypass valve 12. (See the Japanese Patent Application Laid-Open No. 2001-254634, for example.)

Being constructed as mentioned above, compressed air being compressed in the compressor 2 flows into the casing 5 (an outline arrow in the drawing), reverses for approximately 180 degrees (arrows in solid line in the drawing) after going through a tubular space which is formed by an outer circumference surface of the combustor basket 6 and an inner circumference surface of an outer shell 8, and is introduced into the combustor basket 6 from the rear-end side. Next, a fuel is blasted to the pilot burner (not illustrated) at the front end of the pilot nozzle 9 and be subject to diffusion combustion and is also subject to premixed combustion by being mixed with a fuel injected to the main burner (not illustrated) at the front end of each of the main nozzles 10, so as to become high temperature and high pressure combustion gas. The combustion gas goes through the internal of the transition piece 7 and is exhausted from the front end thereof, so as to drive the turbine 4. In addition, a part of compressed air (sometimes referred as "bypass air" hereinafter) inside the casing 5 is supplied to the internal of the transition piece 7 from the bypass duct 11, which plays a role of adjusting the density of combustion gas.

However, although the above-mentioned pre-mixed combustion method seemingly excels in reduction of NOx, it has a problem that combustion vibration is easy to occur because flame is thin and burns in a narrow region in a short time, resulting in an excessive combustion energy per unit space. This combustion vibration is generated by having a part of combustion energy converted into vibrational energy, and not only produces significant vibration and noise when it propagates as a pressure wave and resonates with an acoustical system consisting of casings of a combustor, a gas turbine and the like but also induces pressure fluctuation and heat-generation fluctuation inside the combustor, thereby making state of combustion unstable, which eventually interferes a decrease in NOx.

In order to cope with such a problem of combustion vibration as mentioned above, conventionally, by actually operating a gas turbine, appropriate adjustment is made so as to operate it in a normal condition and, at the same time, regular operational conditions are set as needed. Therefore, cumbersome adjustment activities are indispensable.

Additionally, a conventional combustor trying to reduce the combustion vibration has a resonator having a cavity installed around the outer circumference of a combustor basket and a transition piece which serve as cylinder bodies having a combustion region therein, and has sound-absorption holes opening to the cavity formed therein. (See FIG. 1 through FIG. 3 on pages 3 through 5 of the Japanese Patent Application Laid Open No. 2002-174427, for example.) By this combustor, fluid particles serving as vibration elements of the combustion vibration that occurs in the combustion region resonate with the air in the cavity inside the resonator and vibrate through the sound-absorption holes, damping the vibration amplitude thereof. In this way, it is possible to reduce the combustion vibration, thereby realizing more or less a decrease in NOx.

However, in the conventional combustor trying to reduce the combustion vibration as mentioned above, it is originally assumed that the combustion vibration occurs in a high-frequency area. Therefore, it is effective to the combustion vibration in a high-frequency area, but at the same time, it cannot be said to thoroughly cope with the combustion vibration in a low-frequency area.

DISCLOSURE OF THE INVENTION

It is an object of the present invention to provide a gas turbine combustor and a gas turbine that can reduce the combustion vibration in order to realize a decrease in NOx in a stable manner. Furthermore, it is another object to provide a gas turbine combustor and a gas turbine that can reduce the combustion vibration, irrespective of the frequency areas.

In order to achieve the above-mentioned object, a gas turbine combustor according to the present invention, comprising a cylinder body which has a combustion region therein, is provided with a first box body which is installed outside the cylinder body, forming a first internal space having a predetermined capacity; and a first throat having a predetermined length which has one end thereof open to the combustion region or a downstream area thereof and has the other end thereof open to the first internal space; and has a first resistive element having a multiple number of through-holes inserted and engaged into the one end of the first throat. By this, fluid particles serving as vibration elements of the combustion vibration that occurs in the combustion region are effectively trapped by the first resistive element; resonate with the air in the first internal space being connected through the first throat; and vibrate in the neighborhood of the first resistive element, damping the vibration amplitude thereof. In this way, it is possible to reduce the combustion vibration and realize a stable decrease in NOx. Here, the object to which one end of the first throat opens is a combustor basket or a transition piece which makes up the cylinder body or a bypass duct which is connected to a side wall of the cylinder body.

Additionally, in order to achieve the above-mentioned object, according to the present invention, a gas turbine combustor, comprising a cylinder body which has a combustion region therein, is provided with a box body which is installed outside the cylinder body, forming an internal space having a predetermined capacity; and a throat having a predetermined length which has one end thereof open to an area upstream of the combustion region and has the other end thereof open to the internal space; and has a resistive element having a multiple number of through-holes inserted and engaged into the one end of the throat. By this, fluid particles serving as vibration elements of the combustion vibration that occurs in a combustion region are effectively trapped by the resistive element; resonate with the air in the internal space of the box body being connected through the throat; and vibrate in the neighborhood of the resistive element, damping the vibration amplitude thereof. In this way, it is possible to reduce the combustion vibration and realize a stable decrease in NOx. Here, the object to which one end of the throat opens is a combustor basket which makes up the cylinder body or an outer shell which is installed so as to be concentric with the combustor basket.

In addition, in order to achieve the above-mentioned object, according to the present invention, a gas turbine is equipped with an air compressor and a turbine being directly connected to each other by a main shaft and a plurality of gas turbine combustors being installed on the same circumference of the main shaft between the air compressor and the turbine and consisting of a cylinder body each of which has a combustion region therein; wherein, are provided a first annulus pipe body which is installed outside the rear end of each of the cylinder bodies concentrically with the main shaft and a first throat having a predetermined length which has each of one ends open to an area upstream of each of the combustion regions and has each of the other ends open to the inside of the first annulus pipe body; and wherein, a first resistive element having a multiple number of through-holes is inserted and engaged into each of the one ends of each of the first throats. By this, fluid particles are effectively trapped by each of the first resistive element; resonate with the air inside the first annulus pipe body being connected through each of the first throats; and vibrate in the neighborhood of each of the first resistive elements, damping the vibration amplitude thereof. In this way, it is possible to reduce the combustion vibration and eventually realize a stable decrease in NOx as an entire gas turbine, thereby achieving a reduction of NOx in exhaust gas. Here, the object to which each of the ends of each of the first throats opens is each of combustor baskets which makes up each of the cylinder bodies or each of outer shells which is installed concentrically with each of the combustor baskets.

Furthermore, in order to achieve the above-mentioned object, according to the present invention, a gas turbine combustor, comprising a cylinder body which has a combustion region therein and a bypass duct which has one end open to the combustion region or a downstream area thereof in the cylinder body and has the other end open to the internal of a casing forming the periphery of the cylinder body; wherein, is installed a plate-type member which has a multiple number of through-holes and crosses the bypass duct. By this, fluid particles serving as vibration elements of the combustion vibration that occurs in a combustion region are introduced from one end of the bypass duct and effectively trapped in each of the through-holes of the plate-type member; resonate with the air inside the casing being connected through the bypass duct; and vibrate through each of the through-holes, damping the vibration amplitude thereof. In this way, it is possible to reduce the combustion vibration and realize a stable decrease in NOx.

Moreover, in order to achieve the above-mentioned object, according to the present invention, a gas turbine combustor, comprising a cylinder body which has a combustion region therein and a bypass duct which has one end open to the combustion region or a downstream area thereof in the cylinder body and has the other end open to the internal of a casing forming the periphery of the cylinder body; wherein, are provided a dividing wall which crosses in the neighborhood of the one end of the bypass duct, a protruding pipe which goes through this dividing wall and protrudes from at least one surface of the dividing wall, and a resistive element which is inserted and engaged into this protruding pipe and has a multiple number of through-holes. By this, fluid particles are effectively trapped by the resistive element; resonate with the air in a space from the dividing wall inside the bypass duct being connected through the protruding pipe to the other end; and vibrate in the neighborhood of the resistive element, damping the vibration amplitude thereof. In this way, it is possible to reduce the combustion vibration and realize a stable decrease in NOx.

Furthermore, in order to achieve the above-mentioned object, according to the present invention, a gas turbine is equipped with an air compressor, any of the above-mentioned gas turbines and a turbine. Therefore, it is possible to reduce the combustion vibration in a gas turbine combustor and realize a stable decrease in NOx, thereby achieving a reduction of NOx in exhaust gas.

And, in order to achieve the above-mentioned object further, according to the present invention, a gas turbine combustor, comprising a cylinder body having a combustion region therein; wherein, the cylinder body has a resonator having a cavity installed around the outer circumference thereof; has sound-absorption holes opening to the cavity formed therein; and is provided with a first box body which is installed so as to be adjacent to the resonator, forming a first internal space having a predetermined capacity, and a first throat which has one end thereof open to the cavity and has the other end thereof open to the first internal space. By this, fluid particles serving as vibration elements in a high-frequency area of the combustion vibration that occurs in a combustion region resonate with the air in a cavity inside the resonator and vibrate through the sound-absorption holes, damping the vibration amplitude thereof. On the other hand, fluid particles serving as vibration elements in a low-frequency area resonate with the air in a first internal space being connected through a first throat through the cavity inside the resonator and vibrate through the sound-absorption holes, damping the vibration amplitude thereof. In this way, it is possible to reduce the combustion vibration, regardless of frequency areas, and realize a stable decrease in NOx.

Then, in order to achieve the above-mentioned object further, according to the present invention, a gas turbine is provided with an air compressor, the above-mentioned gas turbine combustor and a turbine. Therefore, it is possible to reduce the combustion vibration in a gas turbine combustor, regardless of frequency areas, and realize a stable decrease in NOx, thereby achieving a reduction of NOx in exhaust gas.

BEST MODE FOR CARRYING OUT OF THE INVENTION

Figure 1:
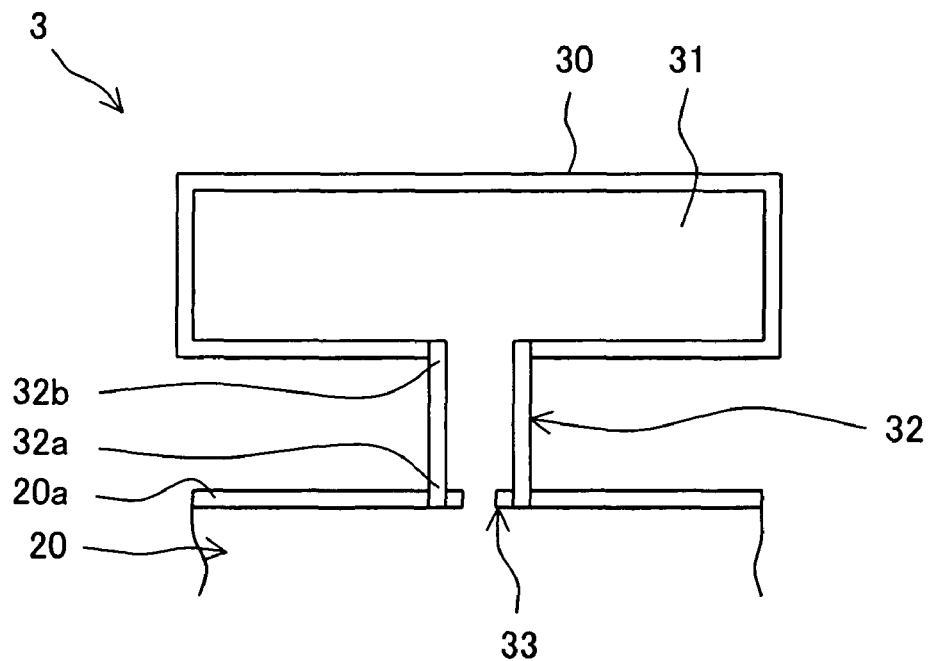
FIG. 1 is a cross section showing a concept of a combustor in accordance with a first embodiment of the prevent invention.

Referring now to the drawings, embodiments of the present invention will be described hereinafter. First a first through eighth embodiments of the present invention will be explained in sequence. FIG. 1 is a cross-sectional view showing a concept of a combustor in accordance with a first embodiment of the present invention. In the drawings, same symbols will be supplied to portions which have same name and same function as in FIG. 47 and the overlapping explanations will be omitted. The same will apply to a second through eighth embodiments of the present invention to be hereinafter described.

Figure 47:
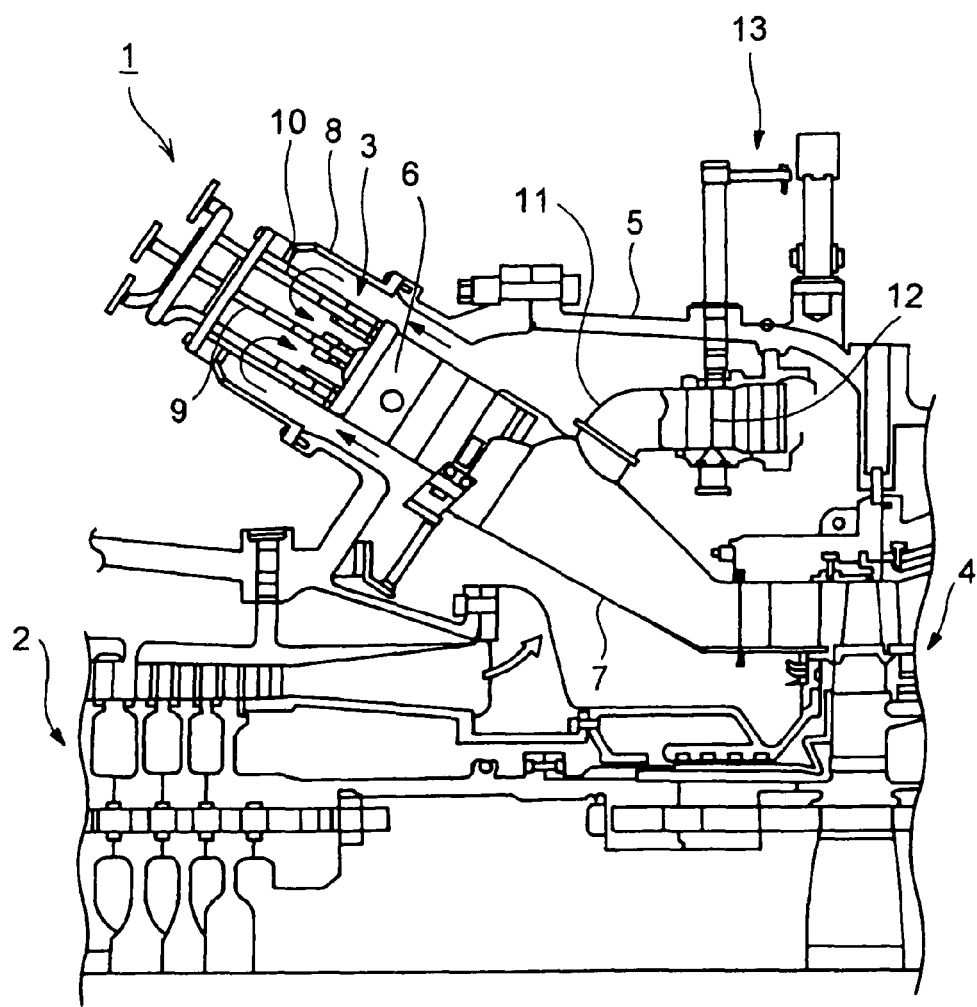
FIG. 47 is a longitudinal cross-sectional view of a necessary portion in the neighborhood of a combustor of a general gas turbine.

A combustor 3 in accordance with a first embodiment of the present invention is applied to a gas turbine 1 shown in FIG. 47. As shown in FIG. 1, a first box body 30 is installed outside a side wall 20a of an object body 20, and a first internal space 31 having a predetermined capacity is formed by a cavity inside the first box body 30. Additionally, the first box body 30 is connected to the side wall 20a through a first tubular throat 32 having a predetermined length, and the first throat 32 has one end 32a open to the internal of the object body 20 from the side wall 20a and has the other end 32b open to the first internal space 31.

Further, a first resistive element 33 having a multiple number of through-holes is inserted and engaged into one end 32a of the first throat 32. The first resistive element 33 is, for example, a punching metal, a ceramic sintered metal or a sintered metallic mesh. In addition, the object body 20 mentioned herein is a cylinder body such as the combustor basket 6 having a combustion region therein or the transition piece 7 in an area downstream thereof, or the bypass duct 11 being connected to the side walls thereof and is an object whose inside has combustion vibration propagate.

Constructed as described above, the first box body 30 functions as an air-container body which accommodates the air for resonance for fluid particles serving as vibration elements of the combustion vibration that occurs in a combustion region inside the combustor basket 6. Additionally, the first throat 32 functions as a junction body which connects the object body 20 and the first box body 30. Moreover, the first resistive element 33 functions as a transverse body which crosses inside the first throat 32, and through-holes thereof function as vents where fluid particles are vibrated by resonance with the air inside the first box body 30. In this way, as for the combustion vibration that occurs in a combustion region inside the combustor basket 6, fluid particles serving as vibration elements thereof are effectively trapped by the first resistive element 33 by propagating inside the object body 20; and then resonate with the air in a first internal space 31 being connected through the first throat 32 and vibrate in the neighborhood of the first resistive element 33. By this vibration, vibration amplitude of the fluid particles is damped and the combustion vibration thereof is reduced. As a result, a stable reduction of NOx is realized.

Additionally, in FIG. 1, one first throat 32 is installed for the first box body 30. However, needless to say, more than two first throats 32 may be installed.

Figure 2:
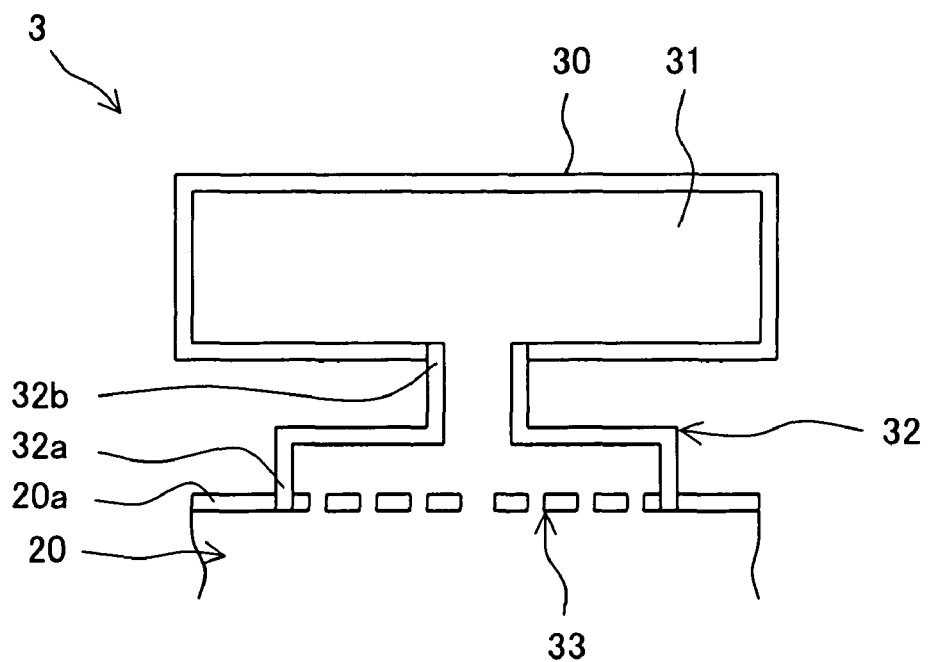
FIG. 2 is a cross section showing a concept of a combustor in accordance with a second embodiment of the prevent invention.

Then, a second embodiment of the present invention will be described by referring to FIG. 2. Characteristic of a second embodiment is that consideration is given especially to combustion vibration in a low-frequency area in a first embodiment. When combustion vibration occurs in a low-frequency area, it is necessary to make a cross-sectional area inside the first throat 32 in accordance with the first embodiment smaller. However, if doing so, an area where the first resistive element 33 exists inevitably becomes smaller, which reduces the ratio of fluid particles to be trapped, contributing to a decrease in combustion vibration insufficiently as a whole.

Consequently, in accordance with this embodiment, such a stepped tubular object is applied as the first throat 32 as an inner circumference thereof is rapidly spread from one end 32b to the other end 32a in the neighborhood of the center, wherein an opening area of one end 32a thereof is larger than that of the other end 32b. The first resistive element 33 is inserted and engaged into one end 32a.

Because in this way, it is possible to make an internal of the first throat 32, namely the cross-sectional area of the other end 32b, smaller and at the same time, expand a region where the first resistive element 33 exists, the ratio of trapping of fluid particles in a low-frequency area is increased, thereby contributing to a reduction of combustion vibration sufficiently as a whole. As a result, it is possible to reduce thoroughly the combustion vibration in a low-frequency area as a whole.

Additionally, when a trumpet-like object whose inner circumference gradually expands is applied as the first throat 32, the same effects can be obtained.

Figure 3:
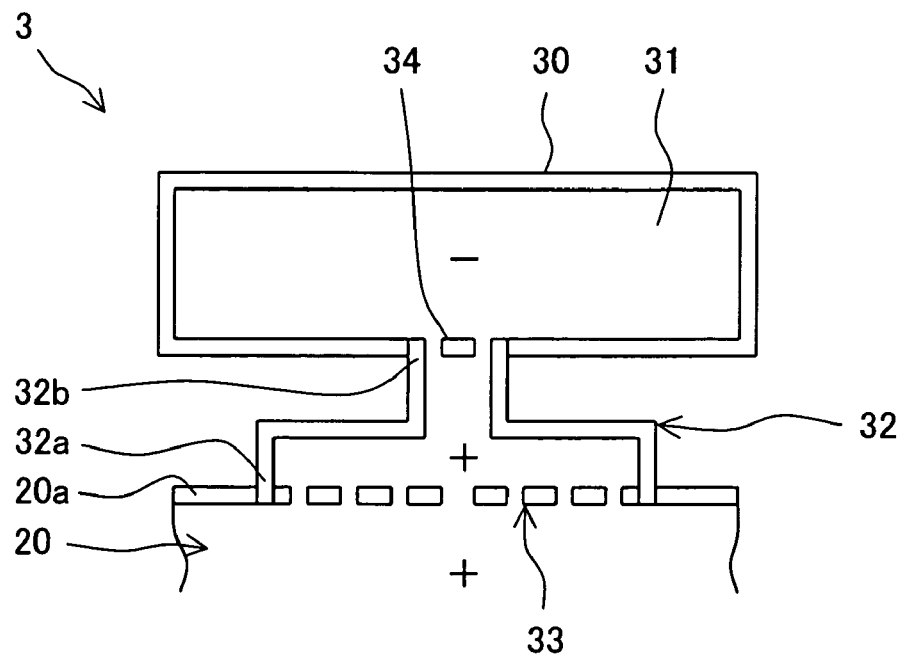
FIG. 3 is a cross section showing a concept of a combustor in accordance with a third embodiment of the prevent invention.

Next, a third embodiment of the present invention will be described by referring to FIG. 3. Characteristic of a third embodiment is that consideration is given to adverse effects that occur in the second embodiment. As the second embodiment, when an opening area of one end 32a is larger than that of the other end 32b in the first throat 32, namely when the capacity inside the first throat 32 becomes larger, sometimes a phase difference does not occur for each of pressure fluctuations between a space inside the first throat 32 being isolated by the first resistive element 33 and a space of the object body 20 ("+" and "+" in the drawing). In such a case, because fluid particles do not vibrate in the neighborhood of the first resistive element 33, such an adverse effect is caused as combustion vibration in a low-frequency area cannot be reduced sufficiently if nothing is done.

Therefore, in this embodiment, the first throat 32 has a resistive element 34 having a multiple number of through-holes inserted and engaged into the other end 32b thereof. Same as the first resistive element 33, the resistive element 34 is, for example, a punching metal, ceramic sintered metal or sintered metallic mesh.

Constructed as described above, a phase difference occurs for each of pressure fluctuations ("−" and "+" in the drawing) between the first internal space 31 and the space inside the first throat 32. Therefore, by utilizing this, fluid particles vibrate effectively in the neighborhood of the resistive element 34. As a result, although vibration of fluid particles in the neighborhood of the first resistive element 33 is insufficient, combustion vibration in a low-frequency area can be reduced sufficiently.

Additionally, when the resistive element 34 is placed in either position of one end 32b having a smaller cross-sectional area than the other end 32a in the first throat 32, same effects can be obtained.

Figure 4:
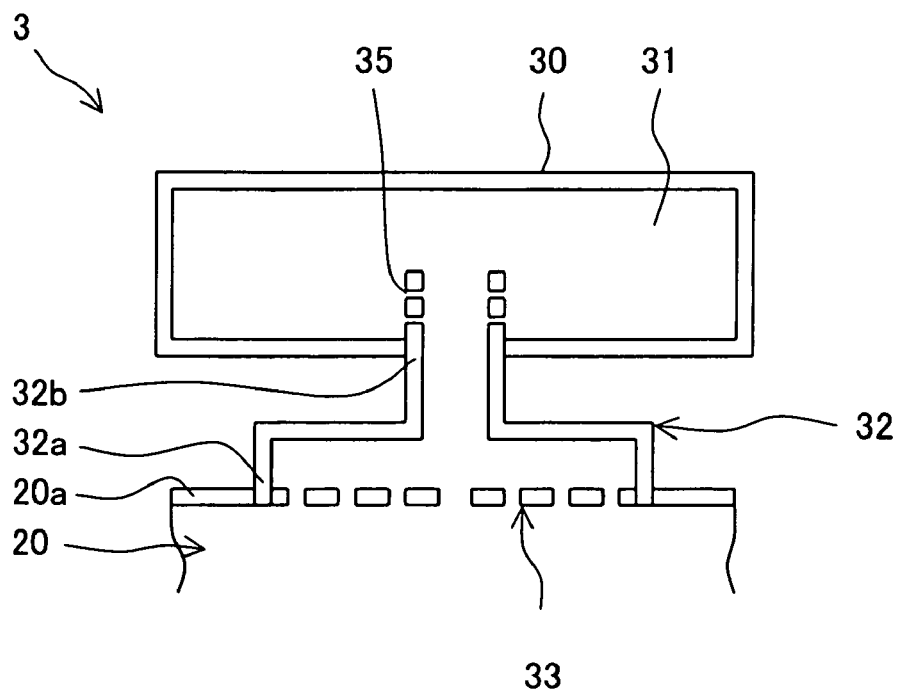
FIG. 4 is a cross section showing a concept of a combustor in accordance with a fourth embodiment of the prevent invention.

Next, a fourth embodiment of the present invention will be described by referring to FIG. 4. Characteristic of a fourth embodiment is that same as the third embodiment, consideration is given to adverse effects occurring in the second embodiment.

Namely, in accordance with the relevant embodiment, one end 32b of the first throat 32 protrudes into the first internal space 31, and a multiple number of through-holes 35 are formed in this protruding portion. Constructed in this manner, because fluid particles vibrate effectively in each of through-holes 35 by same action as the resistive element 34 in the third embodiment, combustion vibration in a low-frequency area can be thoroughly reduced in the same manner as the third embodiment.

Next, a fifth embodiment of the present invention will be described by referring to FIG. 5. Characteristic of a fifth embodiment is that combustion vibration in a low-frequency area is reduced more thoroughly as a whole, and a plurality of first box bodies 30 and the like, serving as major components of the first through fourth embodiments, are installed in parallel.

By this, an area where the first resistive element 33 exists can be expanded as a whole. As a result, a ratio of trapping of fluid particles in a low-frequency area is increased, thereby making it possible to reduce combustion vibration in a low-frequency area more sufficiently as a whole.

Figure 5:
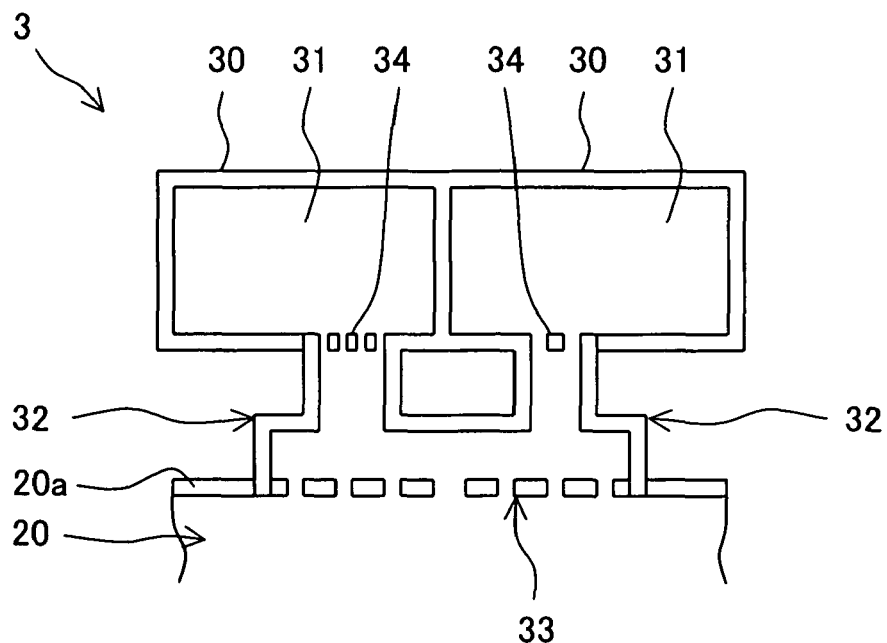
FIG. 5 is a cross section showing a concept of a combustor in accordance with a fifth embodiment of the prevent invention.

Here, in FIG. 5, a plurality of first box bodies 30 and the like (See FIG. 4) in accordance with the fourth embodiment are installed in parallel. At least one of the opening area or the length of each of the ends 32b of a first throat 32 and the capacity of each of first internal spaces 31 being formed by each of first box bodies 30, is mutually different. By this, vibration properties responding to each of first box bodies 30 and the like differ, so that it is possible to respond to various combustion vibrations in different frequency areas without fail.

Figure 6:
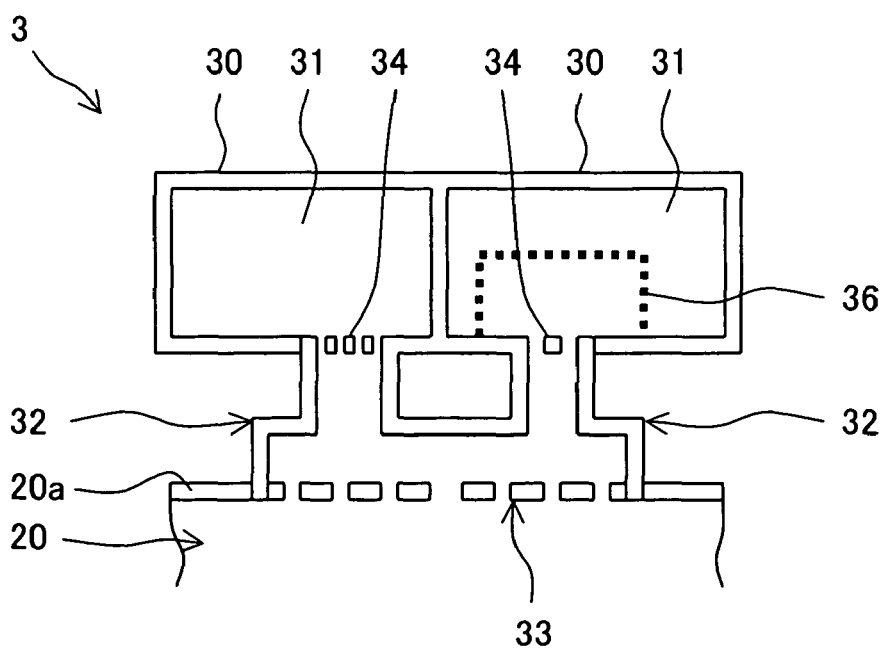
FIG. 6 is a cross section showing a concept of a combustor in accordance with a sixth embodiment of the prevent invention.

Next, a sixth embodiment of the present invention will be described by referring to FIG. 6. Characteristic of a sixth embodiment is that further consideration is given to combustion vibration in a high-frequency area in the fifth embodiment. In a case of combustion vibration in a high-frequency area, wavelength is short. Therefore, a phase difference of pressure fluctuation occurs in the first internal space 31 itself and consequently, fluid particles do not vibrate sufficiently in the neighborhood of the first resistive element 33 or the resistive element 34 and combustion vibration in a high-frequency area cannot be reduced sufficiently if nothing is done.

Therefore, in accordance with the relevant embodiment, a resistive element 36 having a multiple number of through-holes is installed to at least one of each of first internal spaces 31. Same as the first resistive element 33 and the resistive element 34, the resistive element 36 is, for example, a punching metal, ceramic sintered metal or a sintered metallic mesh.

Constructed as described above, because fluid particles vibrate in the neighborhood of the resistive element 36 due to a phase difference of pressure fluctuation being caused by a first internal space 31 itself, combustion vibration in a high-frequency area can be reduced.

Figure 7:
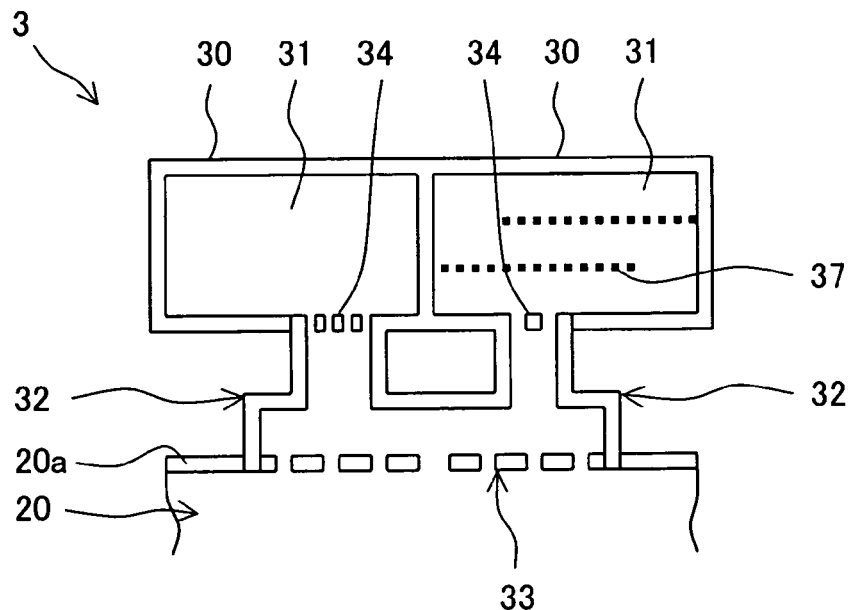
FIG. 7 is a cross section showing a concept of a combustor in accordance with a seventh embodiment of the prevent invention.

Next, a seventh embodiment of the present invention will be described by referring to FIG. 7. Characteristic of a seventh embodiment is that same as the sixth embodiment, consideration is given to combustion vibration in a high-frequency area in the fifth embodiment.

In other words, in accordance with the relevant embodiment, a protruding plate 37 having a multiple number of through-holes is installed, protruding through each of first internal spaces 31 so as to form a connecting passageway from an end 32b of the first throat 32. Constructed as this, because fluid particles effectively vibrate in each of through-holes of the protruding plate 37 due to same action of the resistive element 36 in accordance with the sixth embodiment, combustion vibration in a high-frequency area can thoroughly be reduced.

Next, an eighth embodiment of the present invention will be described by referring to FIG. 8. Characteristic of an eighth embodiment is that combustion vibration is reduced efficiently. Therefore, an eighth embodiment has an aspect that a plurality of first box bodies 30 and the like serving as major components of the first through seventh embodiments are installed as if they are installed in a row behind each other.

To put simply, in accordance with the relevant embodiment, outside the first box body 30, is installed in a row a second box body 40 being similar to the first box body 30, and by a cavity inside the second box body 40, is formed a second internal space 41 having a predetermined capacity. Additionally, the second box body 40 is connected to the first box body 30 through a second throat 42 in a tubular form having a predetermined length in a same manner as the first throat 32, and the second throat 42 has one end 42a located on a side of the first box body 30 open to a first internal space 31 and has the other end 42b located on a side of the second box body 40 open to a second internal space 41.

Moreover, a second resistive element 43 having a multiple number of through-holes is inserted and engaged into one end 42a of the second throat 42. Same as the first resistive element 33, the second resistive element 43 is, for example, a punching metal, ceramic sintered metal or a sintered metallic mesh.

By this, fluid particles not only vibrate in the neighborhood of the first resistive element 33 but also resonate with the air in each of second internal spaces 41 being connected through each of second throats 42 and vibrate in the neighborhood of each of second resistive elements 42, thereby damping the vibration amplitude thereof. As a result, it is possible to make fluid particles vibrate in a multiple number of places and consequently, combustion vibration can be reduced efficiently.

Figure 8:
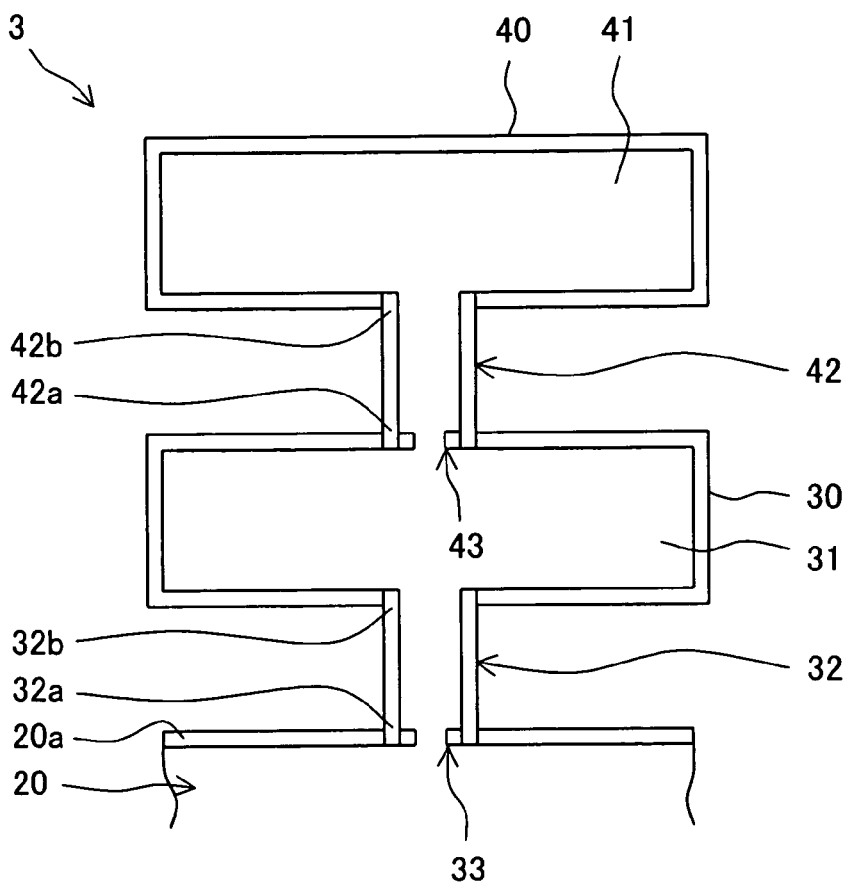
FIG. 8 is a cross section showing a concept of a combustor in accordance with an eighth embodiment of the prevent invention.

Additionally, in FIG. 8, one second box body 40 is installed in a row to so as to be connected to each of first box bodies 30. However, needless to say, more than two second box bodies 40 may be installed in a row. In this case, it is only necessary to connect the second box bodies adjoining each other through the above-mentioned second throat 42 respectively.

Additionally, same as the concept of the second through fifth embodiments of the present invention, the following deformation may be possible, considering more sufficient response to combustion vibration in a low-frequency area. Following the first throat 32 in accordance with the second embodiment, one end 42a of the second throat 42 has a larger opening area than the other end 42b. Following the resistive element 34 of the first throat 32 in accordance with the third embodiment, a resistive element having a multiple number of through-holes is inserted and engaged into the other end 42b of the second throat 42. Following the first throat 32 in accordance with the fourth embodiment, the other end 42b of the second throat 42 protrudes through the second internal space 41 and a multiple number of through-holes are formed in this protruding portion. Following the first box bodies 30 and the like in accordance with the fifth embodiment, a plurality of second box bodies 40 and the like are installed in a parallel, and at least one of the opening area or the length of each of ends 42b of a second throat 42 and the capacity of each of second internal spaces 41 is mutually different for every second box body 40.

Furthermore, same as the concept of the sixth and seventh embodiments, the following deformation may be possible, considering more sufficient response to combustion vibration in a high-frequency area. Following the resistive element 36 in accordance with the sixth embodiment, at least one of each of second internal spaces 41 has a resistive element having a multiple number of through-holes installed. Following the protruding plate 37 in accordance with the seventh embodiment, at least one of second box bodies 40 has a protruding plate having a multiple number of through-holes installed, protruding through each of second internal spaces 41 and forming a continuous passageway from an end 42b of the second throat 42.

Figure 9:
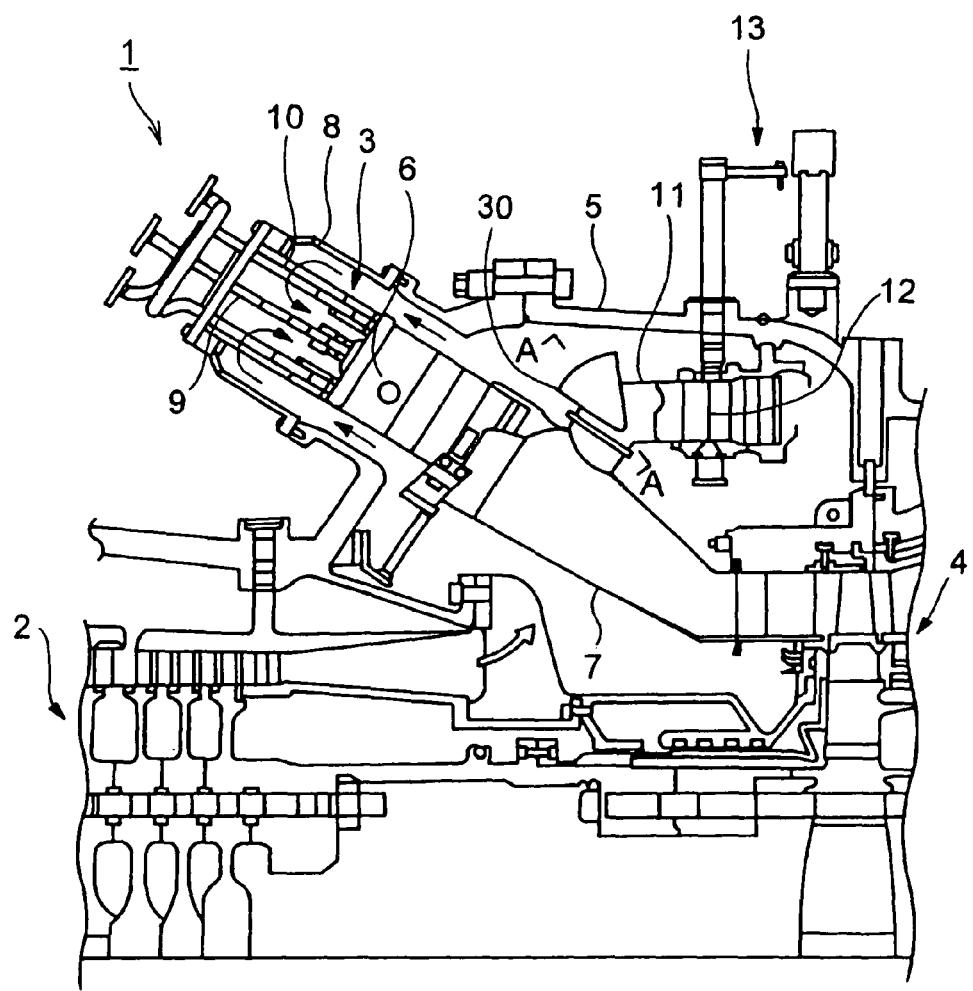
FIG. 9 is a longitudinal cross-sectional view of a necessary portion showing one example of a gas turbine to which a combustor in accordance with a first through eighth embodiments of the present invention is applied concretely.
Figure 10:
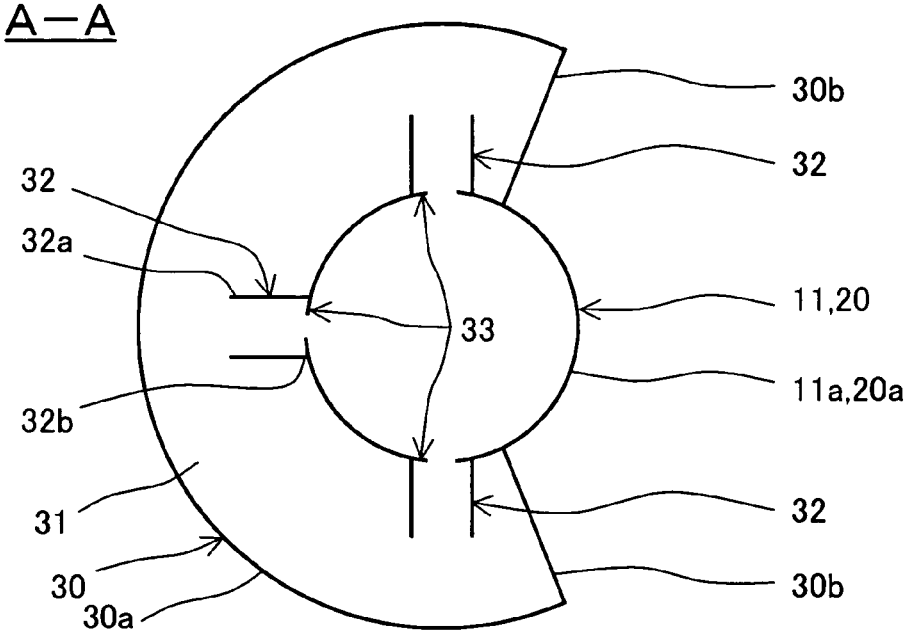
FIG. 10 is a transverse cross-sectional view corresponding to the cross section A-A of FIG. 9.
Figure 11:
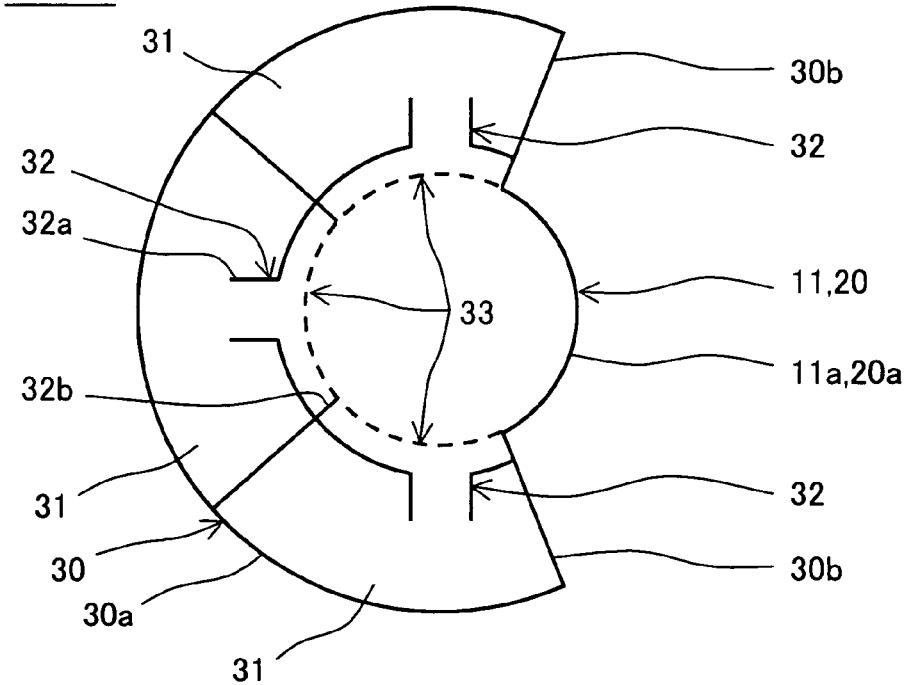
FIG. 11 is a transverse cross-sectional view corresponding to the cross section A-A in FIG. 9, showing another example of a gas turbine to which a combustor in accordance with a first through eighth embodiments of the present invention is applied concretely.

Now, basic concepts of the present invention are explained as above, based on the first through eighth embodiments, and by referring to the drawings, an example of a gas turbine to which these concepts are applied concretely will be described. FIG. 9 is a longitudinal cross-sectional view of a necessary portion of a gas turbine to which a combustor in accordance with the above-mentioned first through eighth embodiments are applied concretely, and FIG. 10 is a transverse cross-sectional view corresponding to the cross section A-A of FIG. 9. In addition, FIG. 11 shows another example of a gas turbine to which a combustor in accordance with the above-mentioned first through eighth embodiments are applied concretely and is a transverse cross-sectional view corresponding to the cross-section A-A of FIG. 9. In the drawings, same symbols will be supplied to portions which have same name and function as FIG. 1 through FIG. 8 and overlapping explanation will be omitted.

As shown in FIG. 9, a first box body 30 having a fan-shaped side view is installed outside and along an elbow portion of the bypass duct 11. The first box body 30, as shown in FIG. 10, has a transverse section thereof consist of a circular arc portion 30a and a bending portion 30b facing toward a side wall 11a of the bypass duct 11 from both ends of the circular arc portion 30a, and a first internal space 31 is formed by these circular arc portion 30a, bending portion 30b and side wall 11a.

Additionally, three first throats 32 protruding from the side wall 11a are installed at regular intervals for same degrees in the first internal space 31. Each of ends 32a of these first throats 32 opens to the internal of the bypass duct 11 from the side wall 11a while each of the other ends 32b opens to the first internal space 31. Further, each of ends 32a of each of first throats 32 has a first resistive element 33 having a multiple number of through-holes inserted and engaged.

In other words, construction shown in FIG. 9 and FIG. 10 adopts a bypass duct 11 as an object body 20 and follows the above-mentioned first embodiment. Additionally, construction shown in FIG. 11 adopts a bypass duct 11 as an object body 20 and follows the above-mentioned fifth embodiment.

The reasons why a bypass duct 11 is adopted as an object body 20 here are that in order to reduce combustion vibration effectively, a certain size is necessary for a first internal space 31 and a certain length is necessary for a first throat 32 and that an area in the neighborhood of the bypass duct 11 having a rather sufficient room is suitable. In consequence, there are advantages that it is easy to install a first box body 30, being installed in order to form a first internal space 31, and a first throat 32, and that it is possible to sufficiently secure a first internal space 31 having a certain size necessary for effective reduction of combustion vibration as well as a first throat 32 having a certain length.

Additionally, in accordance with the above-mentioned first through eighth embodiments, shape of transverse cross sections of the first throat 32 and the second throat 42 is not only round but also it may be polygonal.

Figure 12:
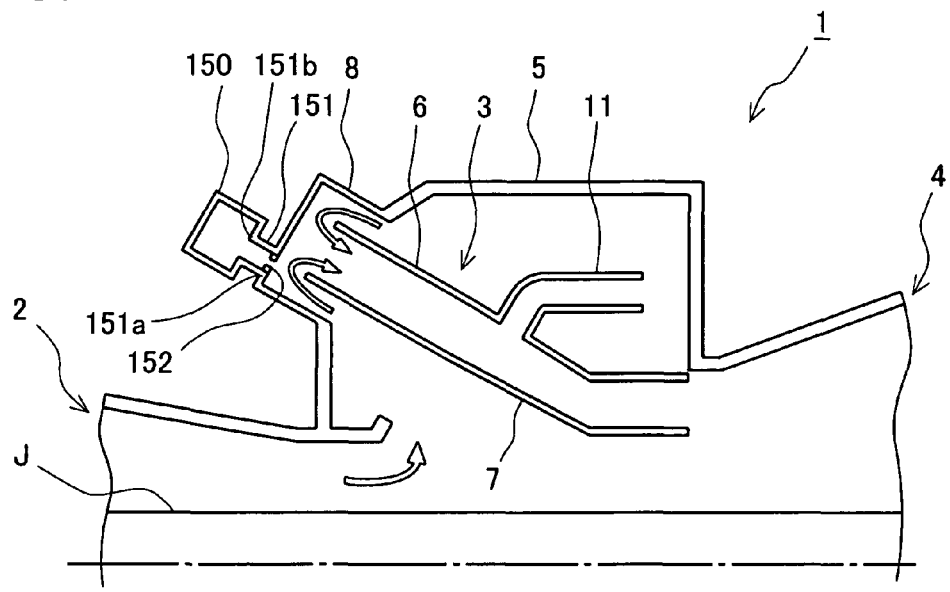
FIG. 12 is an exemplary longitudinal cross-sectional view of a necessary portion showing a neighborhood of a gas turbine combustor in accordance with a ninth embodiment of the present invention.

Next, a ninth through fourteenth embodiments of the present invention will be described by referring to the drawings in sequence. FIG. 12 is an exemplary longitudinal cross-sectional view of a necessary portion showing the neighborhood of a gas turbine combustor in accordance with a ninth embodiment of the present invention. In the drawings, same symbols will be supplied to portions which have same name and function as in FIG. 47 and the overlapping explanations will be omitted. The same will apply to a tenth through fourteenth embodiments of the present invention to be hereinafter described.

A combustor 3 in accordance with a ninth embodiment of the present invention basically has a same construction as what is applied to a gas turbine 1 shown in FIG. 47, but is different in the following points. To put simply, as shown in FIG. 12, a box body 150 is installed outside the rear-end wall of the outer shell 8, and an internal space having a predetermined capacity is formed by a cavity inside the box body 150. Additionally, the box body 150 is connected to the rear-end wall of the outer shell 8 through a tubular throat 151 having a predetermined length, and the throat 151 has one end 151a open to the internal of the outer shell 8, namely to an area upstream of a combustion region, and has the other end 151b open to an internal space of the box body 150.

Furthermore, one end 151a of the throat 151 has a resistive 152 having a multiple number of through-holes inserted and engaged. The resistive element 152 is, for example, a punching metal, ceramic sintered metal or a sintered metallic mesh.

Constructed as described above, the box body 150 functions as an air-container body which accommodates the air for resonance for fluid particles serving as vibration elements of combustion vibration that occurs in a combustion region inside the combustor basket 6. Additionally, the throat 151 functions as a junction body which connects the outer shell 8 and the box body 150. Moreover, the resistive element 152 functions as a transverse body which crosses the internal of the throat 151, and through-holes thereof function as vents where fluid particles are vibrated by resonance with the air inside the box body 150. In this way, as for combustion vibration occurring in a combustion region inside the combustor basket 6, fluid particles serving as vibration elements thereof are propagated to the internal of the outer shell 8 through the combustor basket 6; trapped effectively by the resistive element 152; then resonate with the air in an internal space of the box body 150; and vibrate in the neighborhood of the resistive element 152. By this vibration, vibration amplitude of the fluid particles is damped and the combustion vibration thereof is reduced. As a result, a stable decrease in NOx is realized.

An outline arrow in the drawing shows a flow of compressed air that is compressed by the compressor 2. Compressed air first flows into the internal of the casing 5; next reverses for approximately 180 degrees after passing through a tubular space being formed by an outer circumference surface of the combustor basket 6 and an inner circumference surface of the outer shell 8, so as to be introduced into the internal of the combustor basket 6 from the rear-end side thereof; and then is subject to diffusion combustion and premixed combustion with a fuel inside the combustor basket 6. Combustion gas produced as a result is discharged to the turbine 4 from the front end thereof through the transition piece 7.

Figure 13:
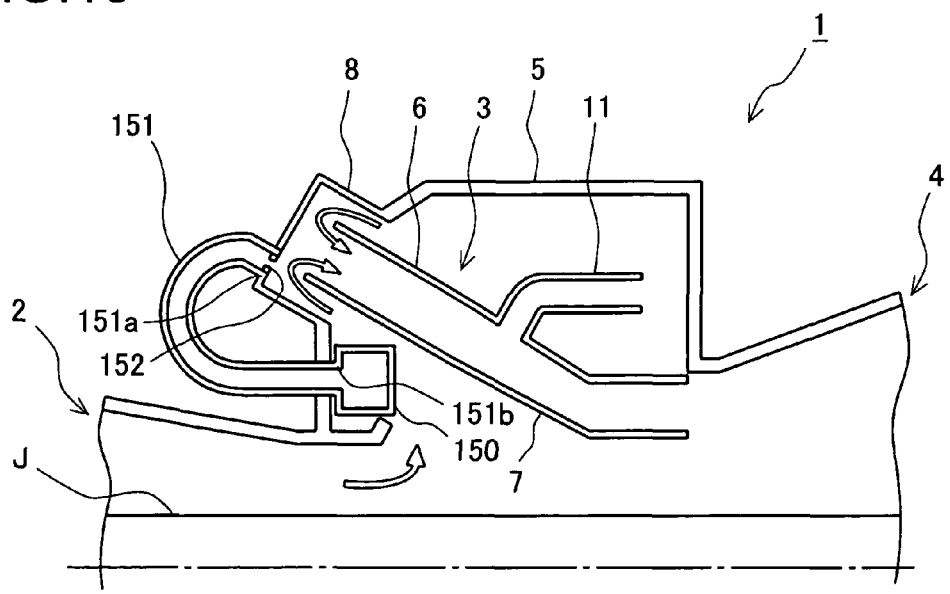
FIG. 13 is an exemplary longitudinal cross-sectional view of a necessary portion showing a neighborhood of a gas turbine combustor in accordance with a tenth embodiment of the present invention.

Next, a tenth embodiment of the present invention will be described by referring to FIG. 13. Characteristic of a tenth embodiment is that construction of the box body 150 in accordance with the ninth embodiment is simplified. This will make an internal space of the box body 150 be in a condition of far higher pressure than the atmosphere pressure. However, as shown in FIG. 12, when the box body 150 itself is installed outside the combustor 3, namely below the atmosphere pressure, remarkable pressure difference will be caused between the inside and the outside of the box body 150, so that pressure-tight construction withstanding the pressure difference is indispensable for the box body 150. As a result, there is a potential that the box body 150 might be made larger than necessary.

Therefore, in accordance with this embodiment, the box body 150 is installed inside the casing 5. Additionally, in installation, it is only necessary to bend the throat 151 so as to be inserted into the casing 5. By this, the box body 150 itself is placed inside the casing 5 which is under approximately same pressure as the internal space, so that pressure difference between the inside and the outside is scarcely produced. As a result, special pressure-tight construction is not necessary for the box body 150, and the box body 150 does not need to get larger than necessary.

Next, an eleventh embodiment of the present invention will be described by referring to FIG. 14. Characteristic of an eleventh embodiment is that an object to which an end 151*a* of a throat 151 in accordance with the ninth and tenth embodiments opens is changed.

Figure 14:
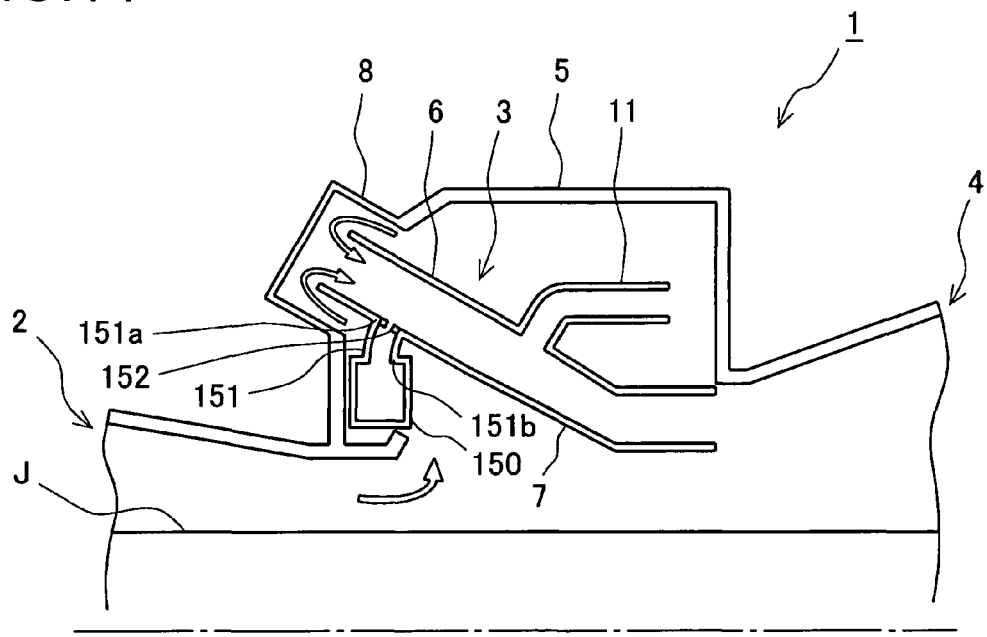
FIG. 14 is an exemplary longitudinal cross-sectional view of a necessary portion showing a neighborhood of a gas turbine combustor in accordance with an eleventh embodiment of the present invention.

To put simply, as shown in FIG. 14, one end 151*a* of the throat 151 opens to the internal of the combustor basket 6 from a portion of an area upstream of a combustion region in a side wall of the combustor basket 6. Additionally, in FIG. 14, the tenth embodiment (See FIG. 13.) is followed, and a change is made to what has the box body 150 installed inside the casing 5. However, needless to say, a change may be made, by following the ninth embodiment (See FIG. 12.). In such a case, the throat 151 is only necessary to be inserted through the rear-end wall or the side wall of the outer shell 8 and connected to the side wall of the combustor basket 6.

Constructed as described above, same as the above-mentioned ninth and tenth embodiments, fluid particles resonate with the air in an internal space of the box body 150 and vibrate in the neighborhood of a resistive element 152, damping the vibration amplitude thereof.

Additionally, an object to which one end 151*a* of the throat 151 opens may be a side wall of the outer shell 8.

Figure 15:
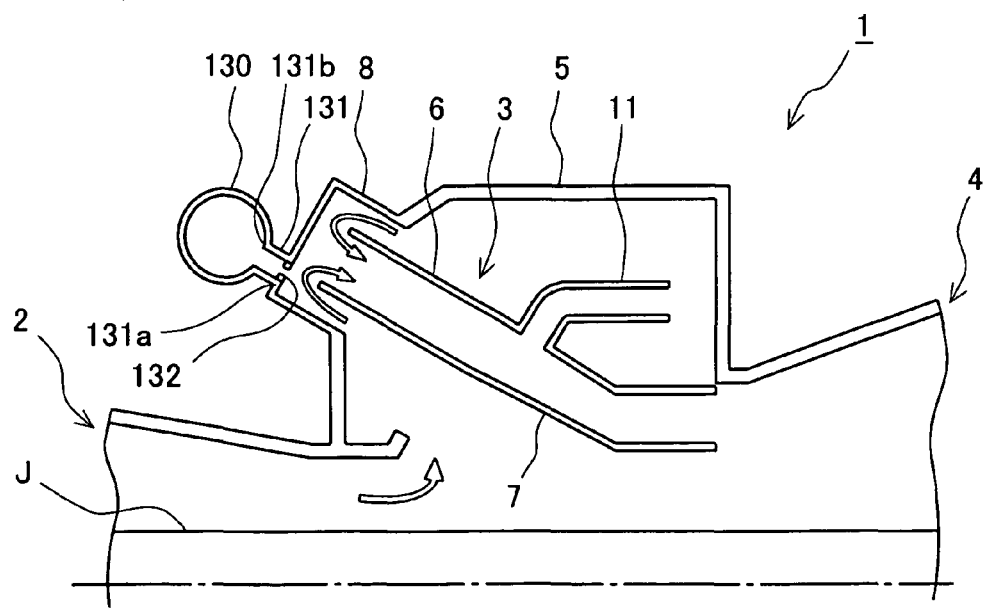
FIG. 15 is an exemplary longitudinal cross-sectional view of a necessary portion showing a neighborhood of a gas turbine combustor in accordance with a twelfth embodiment of the present invention.
Figure 16:
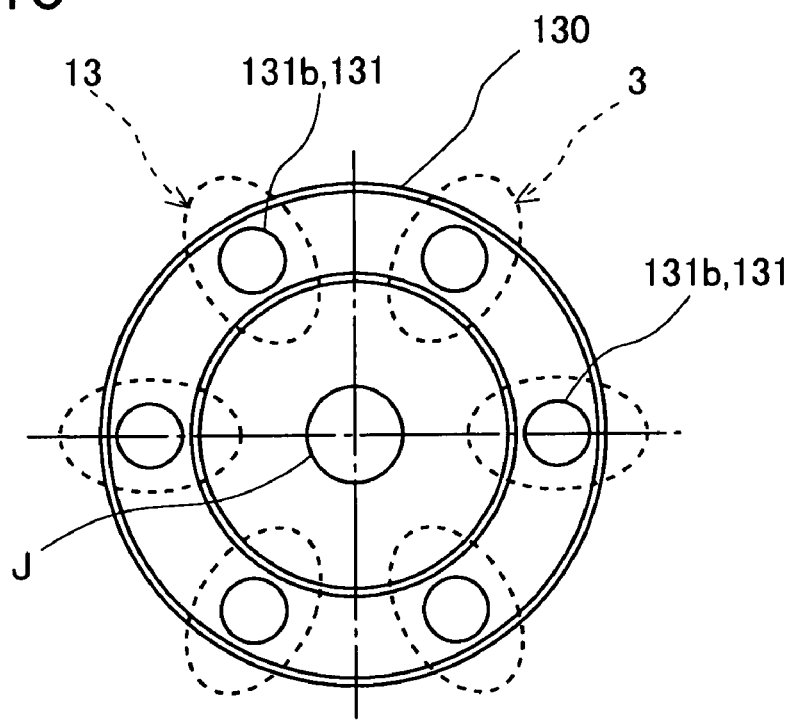
FIG. 16 is an exemplary transverse cross-sectional view of a necessary portion showing a neighborhood of a gas turbine combustor in accordance with a twelfth embodiment of the present invention.

Next, a twelfth embodiment of the present invention will be described by referring to FIG. 15 and FIG. 16. Characteristic of a twelfth embodiment is that combustion vibration is reduced, considering practicality of a gas turbine as a whole.

Before describing characteristic of the relevant embodiment, general layout of a combustor in a gas turbine will be described. As shown in FIG. 15 and FIG. 16, a gas turbine 1 has a plurality of combustors 3 installed thereto mainly for a purpose of supplying rotation force to a turbine 4 efficiently. To be concrete, each combustor 3 is installed at regular intervals for same degrees on a same circumference against a main shaft J which directly connects an air compressor 2 and a turbine 4. (6 combustors at 60-degree intervals in FIG. 16)

Characteristic of the relevant embodiment will be described hereinafter. A first annulus pipe body 130 having an annulus internal space concentrically with the main shaft J is installed so as to be located outside a rear-end wall of each of outer shells 8. Additionally, the first annulus pipe body 130 is connected to the rear-end wall of each of outer shells 8 respectively through a first throat 131 in a tube form having a predetermined length, and the first throat 131 has each of ends 131*a* open to the internal of each of outer shells 8, namely an area upstream of a combustion area and has each of the other ends 131*b* open to the internal of the first annulus pipe body 130.

Furthermore, one end 131*a* of the first throat 131 has a first resistive element 132 having a multiple number of through-holes inserted and engaged. Same as the resistive element 152 in accordance with the ninth through eleventh embodiments, the first resistive element 132 is, for example, a punching metal, ceramic sintered metal or a sintered metallic mesh.

Constructed as mentioned above, a first annulus pipe body 130 functions as an air-container body which accommodates the air for resonance for fluid particles serving as vibration elements of combustion vibration that occurs in a combustion region inside each of combustor baskets 6. Additionally, each of first throats 131 functions as a junction body which connects each of outer shells 8 and the first annulus pipe body 130. Moreover, each of first resistive elements 132 functions as a transverse body which crosses the internal of the first throat 131, and through-holes thereof function as vents where fluid particles are vibrated by resonance with the air inside the first annulus pipe body 130. In this way, fluid particles serving as vibration elements of combustion vibration that occurs in a combustion region inside each of combustor baskets 6 are trapped effectively by each of first resistive elements 132, resonate with the air in the first annulus pipe body 130 being connected through each of first throats 131, and vibrate in the neighborhood of each of first resistive elements 132. By this vibration, vibration amplitude of the fluid particles in each of combustors 3 is damped and the combustion vibration thereof is reduced. As a result, a stable decrease in NOx is realized as an entire gas turbine, thereby achieving reduction of NOx in exhaust gas.

Next, a thirteenth embodiment of the present invention will be described by referring to FIG. 17. Characteristic of a thirteenth embodiment is that fluid particles are made to vibrate more effectively in the neighborhood of each of first resistive elements 132 in accordance with the twelfth embodiment. Because an internal space of the first annulus pipe body 130 in accordance with the twelfth embodiment is one continuous space, there is a case where a phase difference of pressure fluctuation may occur in the internal space itself. In such a case, fluid particles do not vibrate sufficiently in the neighborhood of each of first resistive elements 132 and as a result, combustion vibration cannot be reduced sufficiently if nothing is done.

Figure 17:
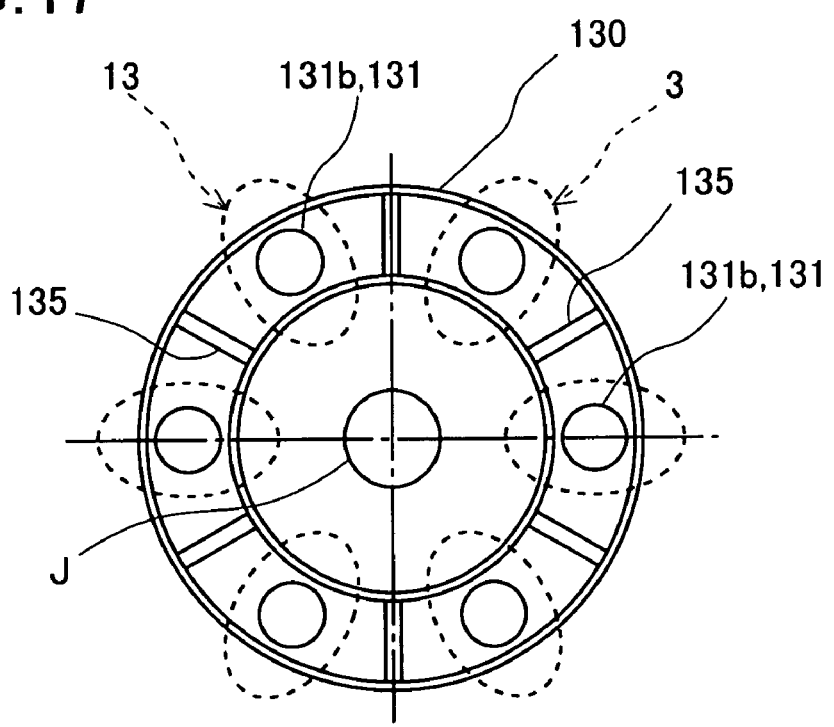
FIG. 17 is an exemplary transverse cross-sectional view of a necessary portion showing a neighborhood of a gas turbine combustor in accordance with a thirteenth embodiment of the present invention.

Consequently, as shown in FIG. 17, in accordance with the relevant embodiment, first dividing wall 135 is installed respectively between each of ends 131b of each of first throats 131 in the first annulus pipe body 130.

Constructed as described above, an internal space in the first annulus pipe body 130 being one continuous space is divided by a first dividing wall 135 for every first throat 131, namely for every combustor 3, thereby restraining a phase difference of pressure fluctuation from occurring in an individual partitioned space. As a result, because fluid particles vibrate effectively enough in the neighborhood of each of first resistive elements 132, combustion vibration can be reduced thoroughly.

Next, a fourteenth embodiment of the present invention will be described by referring to FIG. 18. Characteristic of a fourteenth embodiment is that combustion vibration in accordance with the twelfth and thirteenth embodiments is reduced efficiently.

Figure 18:
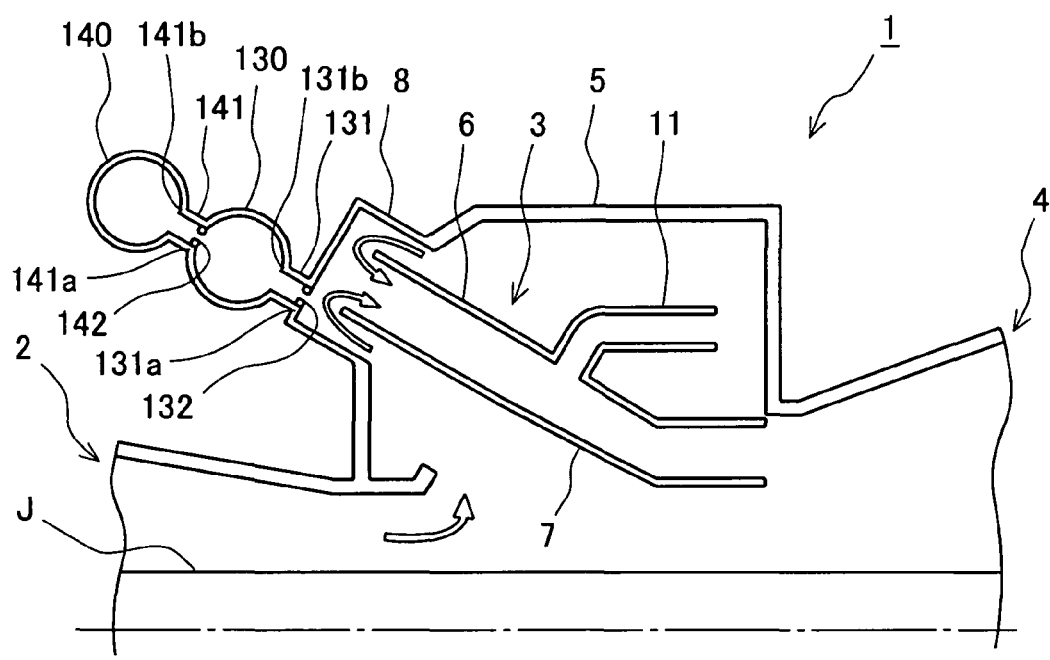
FIG. 18 is an exemplary longitudinal cross-sectional view of a necessary portion showing a neighborhood of a gas turbine combustor in accordance with a fourteenth embodiment of the present invention.

To put simply, as shown in FIG. 18, in accordance with the relevant embodiment, a second annulus pipe body 140 having an internal space in the ring form concentrically with a main shaft J is installed in a row outside a first annulus pipe body 130 in the same manner as the first annulus pipe body 130. Additionally, the second annulus pipe body 140 is connected to the first annulus pipe body 130 respectively through a second throat 141 in the tube form having a predetermined length and corresponding to each of first throats 131, and the second throat 141 has each of ends 141a located on the side of the first annulus pipe body 130 open to the internal of the first annulus pipe body 130 and has each of the other ends 141b located on the side of the second annulus pipe body 140 open to the internal of the second annulus pipe body 140.

Furthermore, each of ends 141a of each of second throats 141 has a second resistive element 142 having a multiple number of through-holes inserted and engaged. Same as the first resistive element 132, the second resistive element 142 is, for example, a punching metal, ceramic sintered metal or a sintered metallic mesh.

Constructed as described above, fluid particles not only vibrate in the neighborhood of each of first resistive elements 132 but also resonate with the air inside the second annulus pipe body 140 connected through each of second throats 141 and vibrate in the neighborhood of each of second resistive elements 142, damping the vibration amplitude thereof. As a result, it is possible to make fluid particles vibrate in a multiple number of locations, thereby reducing combustion vibration efficiently.

In FIG. 18, one second annulus pipe body 140 is installed in a row for a first annulus pipe body 130, but needless to say, more than two may be installed in a row. In this case, it is sufficient only to connect adjoining second annulus pipe bodies 140 through the above-mentioned second throat 141 respectively.

Additionally, from a same purpose as the thirteenth embodiment, second dividing walls (not illustrated) may be installed respectively between each of ends 141b of each of second throats 141 in the second annulus pipe body 140. By doing this, an internal space of the second annulus pipe body 140 being one continuous space is divided by second dividing walls for every second throat 141, namely for every combustor 3 through a first throat 131, thereby restraining a phase difference of pressure fluctuation from occurring in an individual space segment. As a result, because fluid particles vibrate effectively enough in the neighborhood of each of second resistive elements 142, coupled with vibration of fluid particles in the neighborhood of each of first resistive elements 132, combustion vibration can be reduced more thoroughly.

Moreover, an object to which one end 131a of each of first throats 131 opens may be a side wall of the combustor basket 6 or a side wall of the outer shell 8 as long as it is a part of an area upstream of a combustion region.

Additionally, in accordance with the above-mentioned ninth through fourteenth embodiments, shape of a transverse cross-section of a throat 151 or a first throat 131 or a second throat 141 is not limited to a circle but it may be a polygon.

Figure 19:
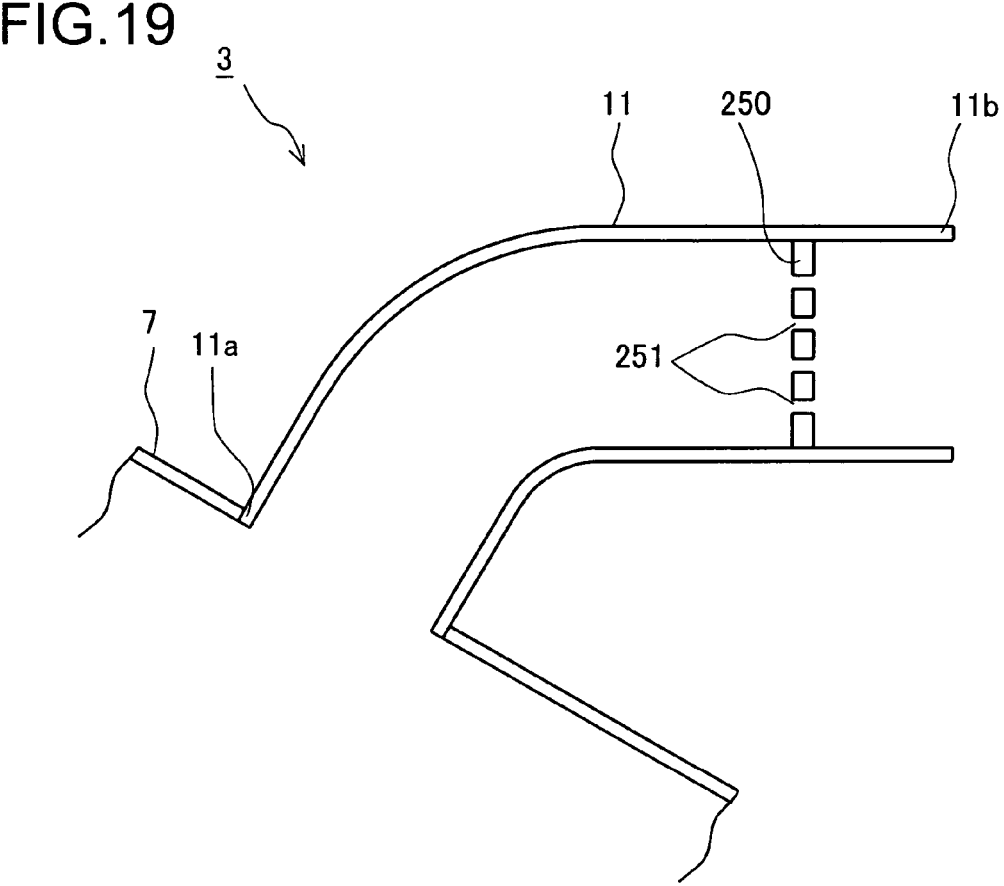
FIG. 19 is a longitudinal cross-sectional view of a necessary portion of a combustor in accordance with a fifteenth embodiment of the present invention.
Figure 20:
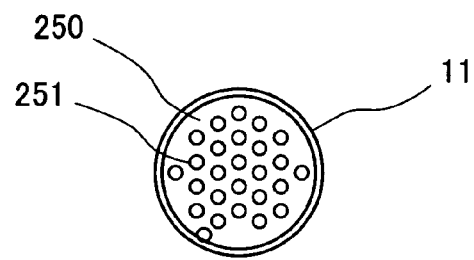
FIG. 20 is a transverse cross-sectional view of a necessary portion of a combustor in accordance with a fifteenth embodiment.

Next, a fifteenth embodiment through twenty-first embodiments of the present invention will be described in sequence by referring to the drawings. FIG. 19 is a longitudinal cross-sectional view of a combustor in accordance with a fifteenth embodiment of the present invention, and FIG. 20 is a transverse cross-sectional view of a necessary portion of the combustor. Additionally, in the drawings, same symbols will be supplied to portions which have same name and same function as in FIG. 47 and the overlapping explanations will be omitted. The same will apply to a sixteenth through twenty-first embodiments of the present invention to be hereinafter described.

A combustor 3 in accordance with a fifteenth embodiment is applied to a gas turbine shown in FIG. 47. As shown in FIG. 19 and FIG. 20, the transition piece 7 is connected to the front end of the combustor basket 6 (not illustrated) having a combustion region, and a cylinder body is constructed by the combustor basket 6 and the transition piece 7 in an area downstream thereof. The bypass duct 11 is connected to a side wall of the transition piece 7, and one end 11a thereof opens to the internal of the transition piece 7 and the other end 11b opens to the internal of the casing 5 forming the periphery of the cylinder body.

Furthermore, the bypass duct 11 has a plate-type member 250 installed so as to transverse therein, and the plate-type member 250 has a multiple number of through-holes 251 formed therein. Such a plate-type member 250 as this is not limited to a metal plate having through-holes 251 drilled through but a punching metal, ceramic sintered metal or a sintered metallic mesh may be applicable.

Constructed as described above, the casing 5 functions as an air-container body which accommodates the air for resonance for fluid particles serving as vibration elements of combustion vibration that occurs in a combustion region inside the combustor basket 6. Additionally, the bypass duct 11 functions as a junction body which connects the transition piece 7 and the casing 5. Moreover, the plate-type member 250 functions as a transverse body which crosses the internal of the bypass duct 11, and through-holes 251 thereof function as vents where fluid particles are vibrated by resonance with the air inside the casing 5. In this way, fluid particles serving as vibration elements of combustion vibration that occurs in a combustion region inside the combustor basket 6 are propagated through the transition piece 7; next introduced from one end 11a of the bypass duct 11 and trapped effectively by each of through-holes 251 of the plate-type member 250; then resonate with the air in the casing 5 being connected through the bypass duct 11 and vibrate through each of through-holes 251. By this vibration, vibration amplitude of the fluid particles is damped and the combustion vibration thereof is reduced. As a result, a stable decrease in NOx is realized.

Additionally, in FIG. 19, one plate-type member 250 is installed for the bypass duct 11, but, needless to say, more than two may be installed in a row.

Next, a sixteenth embodiment of the present invention will be described by referring to FIG. 21 through FIGS. 25A and 25B. Characteristics of a sixteenth embodiment are:

first, combustion vibration is reduced without impairing the original function of the bypass duct 11; and secondly, easy response is possible to various combustion vibrations in different frequency areas.

First characteristic requires the bypass duct 11 to originally have a function to introduce the bypass air from the casing 5 to the internal of the cylinder body (transition piece 7) and adjust the density of combustion gas, namely a function to adjust the flow of the bypass air. This is because, while remaining to be so constructed as the fifteenth embodiment, the plate-type member 250 serves as an obstacle, which makes the bypass air flow insufficient, resulting in such a case as the original function of the bypass duct 11 cannot be carried out.

Second characteristic is for a case where damping responsiveness is deteriorated remarkably according to frequency areas of combustion vibration because in a region of the plate-type member 250 corresponding to a transverse cross-section of the bypass duct 11, responsiveness of damping to various frequency areas of combustion vibration is determined by the ratio occupying the opening area (sometimes referred as "opening ratio" hereinafter) of through-holes 251.

Figure 21:
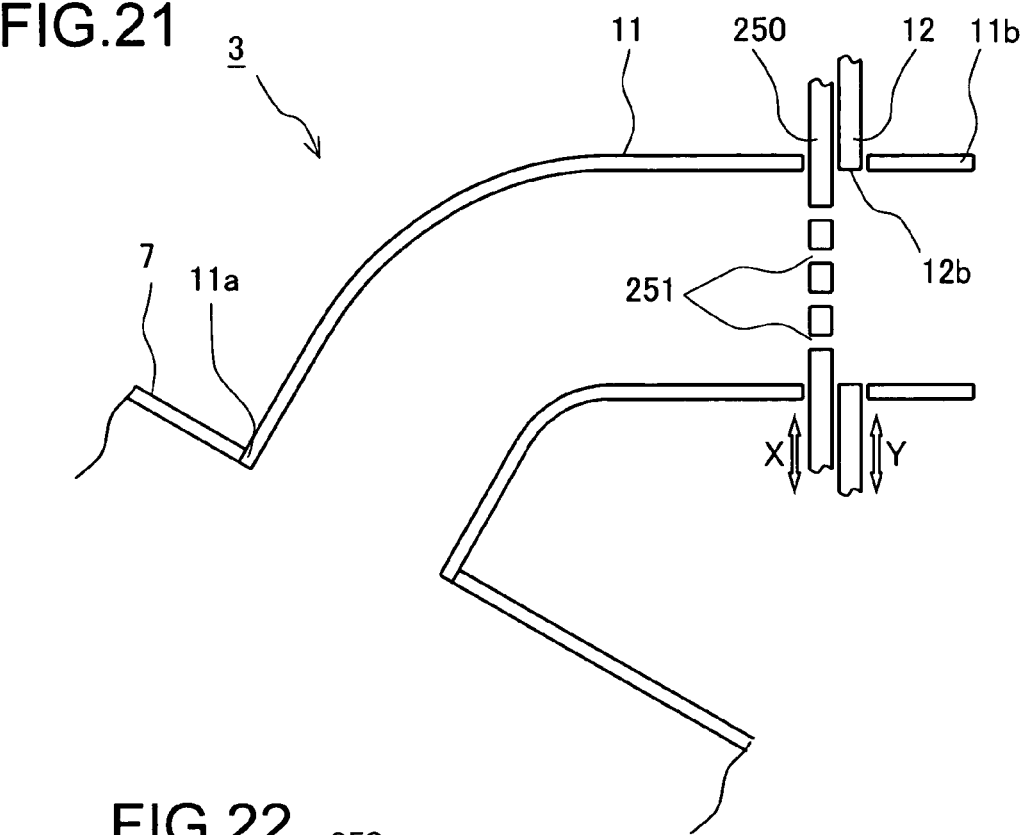
FIG. 21 is a longitudinal cross-sectional view of a necessary portion of a combustor in accordance with a sixteenth embodiment of the present invention.
Figure 22:
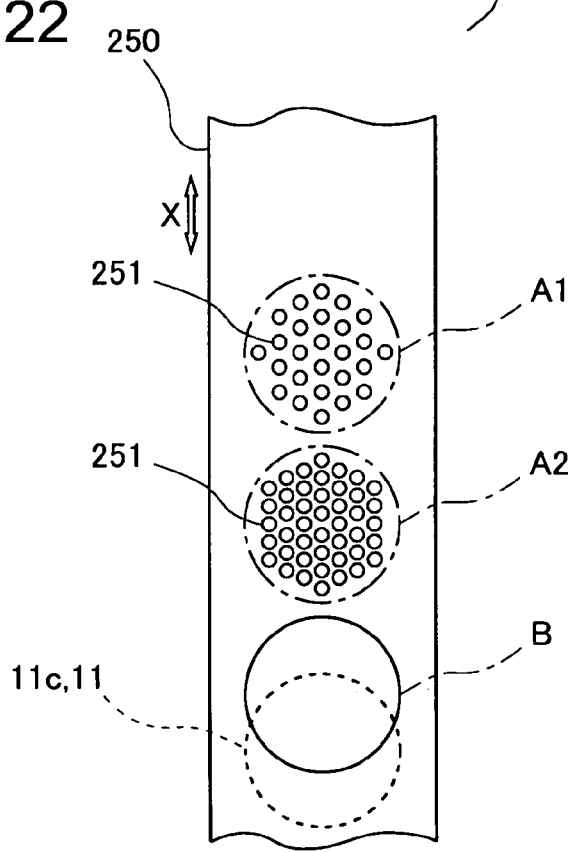
FIG. 22 is a plan view of a plate-type member of a combustor in accordance with a sixteenth embodiment.

Therefore, in accordance with the relevant embodiment, as shown in FIG. 21, the plate-type member 250 is movable by sliding in a transverse direction (an arrow X in the drawing) against the bypass duct 11. As shown in FIG. 22, the plate-type member 250, being approximately of a same size as a transverse cross-section 11c of the bypass duct 11, has through-hole areas A1, A2 . . . formed where the ratio occupying the opening area of the through-holes 250 is mutually different, and further, has a through-area B, being of an approximately same size as the transverse cross-section 11c and penetrating, formed therein. Additionally, in FIG. 21, the opening ratio of the through-holes area A2 is larger than that of through-holes area A1.

Figure 23:
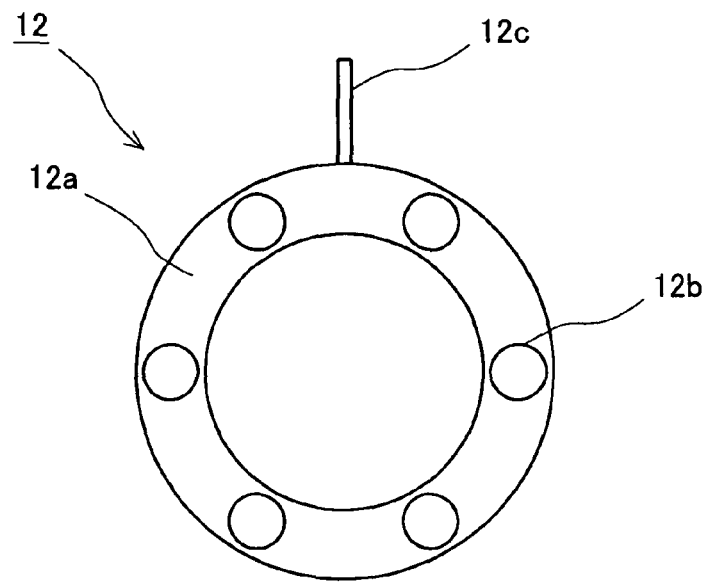
FIG. 23 is a plan view of a bypass valve of a combustor in accordance with a sixteenth embodiment.

Moreover, the bypass duct 11 has the bypass valve 12 installed adjacent to the plate-type member 250. Same as the plate-type member 250, the bypass valve 12 is movable by sliding in a transverse direction (an arrow Y in FIG. 21) against the bypass duct 11. To be concrete, because a plurality of combustors 3 are installed at regular intervals for degrees on a same circumference against a main shaft of a gas turbine 1, the bypass valve 12, as shown in FIG. 23, has a ring-type plate being concentric with the main shaft of the gas turbine 1 serve as a foundation plate portion 12a, and the foundation plate portion 12a is installed so as to cross the bypass duct 11 of each of combustors 3. The foundation plate portion 12a has through-holes 12b corresponding to each of bypass ducts 11 respectively formed therein, and on the periphery of the foundation plate portion 12a is fixed a lever 12c which protrudes in a radial direction and is connected to a bypass-valve variable mechanism 13 (See FIG. 47.).

Then, by operating the bypass-valve variable mechanism 13, the lever 12c moves in a circumferential direction, and with this, the foundation plate member 12a slides and rotates in a circumferential direction, namely slides to move in a transverse direction (an arrow Y in FIG. 21) against each of bypass ducts 11.

Figure 24A:
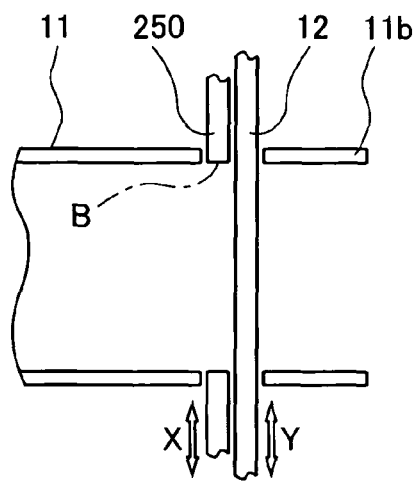
FIG. 24A and FIG. 24B are longitudinal cross-sectional views of a necessary portion showing a behavior to adjust the bypass air amount in a combustor in accordance with a sixteenth embodiment.
Figure 24B:
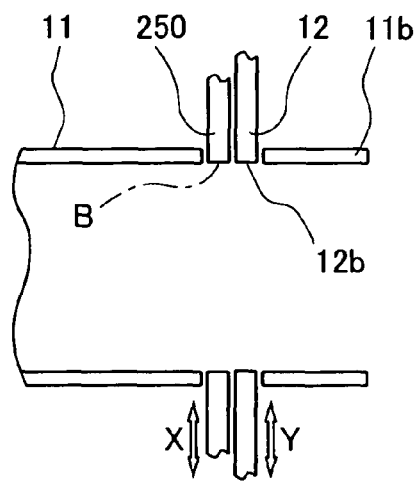

Behavior of the combustor 3 being constructed as mentioned above will be described hereinafter by referring to FIGS. 24A and 24B and FIGS. 25A and 25B. First, in order to adjust the flow of bypass air, which is the original function of the bypass duct 11, as shown in FIGS. 24A and 24B, the plate-type member 250 is slid to move and selected so as to have the through-area B coincide with an area corresponding to a transverse cross-section of the bypass duct 11. By sliding the bypass valve 12 to move in this condition, the degree of opening and closure of the bypass valve 12 is adjusted, thereby adjusting the flow of the bypass air, which is the original function of the bypass duct 11.

For example, when the bypass air is stopped to flow in by closing the bypass duct 11, the plate-type member 250 is slid to move and selected so as to have the through-area B coincide with an area corresponding to a transverse cross-section of the bypass duct 11, and at the same time, the bypass valve 12 is slid so as not to cover the through-hole 12b. (See FIG. 24A.) Also, when the bypass duct 11 is completely opened to have the bypass air flow in fully, the bypass valve 12 is slid to move so as to have the through-hole 12b coincide with an area corresponding to the transverse cross-section of the bypass duct 11. (See FIG. 24B.) Additionally, when the bypass air is adjusted to flow in intermediately, it is only to adjust the ratio of opening so as to have a through-hole 12b partially cover an area corresponding to the transverse cross-section of the bypass duct.

Figure 25A:
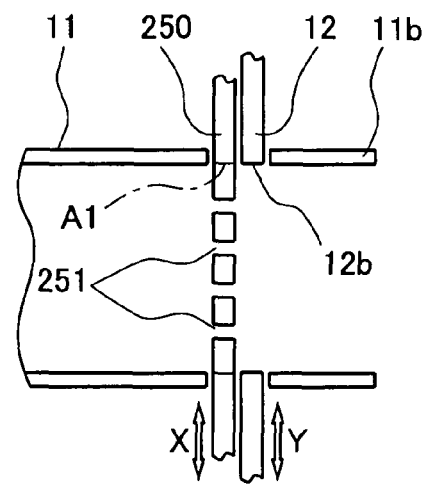
FIG. 25A and FIG. 25B are longitudinal cross-sectional views of a necessary portion showing a behavior to reduce damping vibration in a combustor in accordance with a sixteenth embodiment.
Figure 25B:
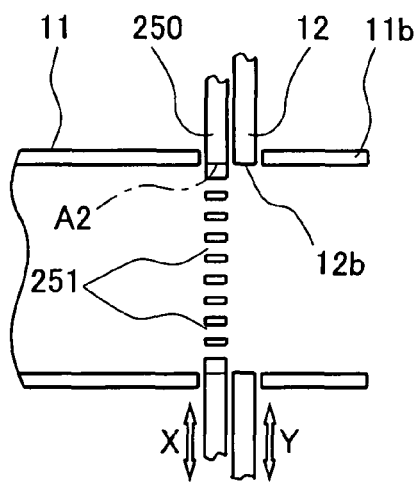

When the combustion vibration is to be reduced, as shown in FIGS. 25A and 25B, the bypass valve 12 is slid to move and selected so as to have the through-hole 12b coincide with an area corresponding to the transverse cross-section of the bypass duct 11. To say simply, the bypass duct 11 is placed in a completely open position. By sliding the plate-type member 250 in this condition, selection is made so that through-holes areas A1, A2 . . . , being worth various frequency areas of combustion vibration, coincide with an area corresponding to the transverse cross-section of the bypass duct 11. For example, FIG. 25A shows a condition where a through-holes area A1 is selected, and FIG. 25B is a condition where a through-holes area A2 is selected. By this, responsiveness of damping for combustion vibration of the frequency area thereof is secured, thereby reducing combustion vibration.

As a result, it is possible to surely reduce combustion vibration for various frequency areas without damaging the original function of the bypass duct.

Next, a seventeenth embodiment of the present invention will be described by referring to FIG. 26 and FIG. 27. Characteristics of a seventeenth embodiment are that same as the sixteenth embodiment, combustion vibration is reduced without damaging the original function of the bypass duct 11 and that at the same time, various combustion vibrations in different frequency areas can easily be responded and furthermore, that construction is simplified.

Figure 26:
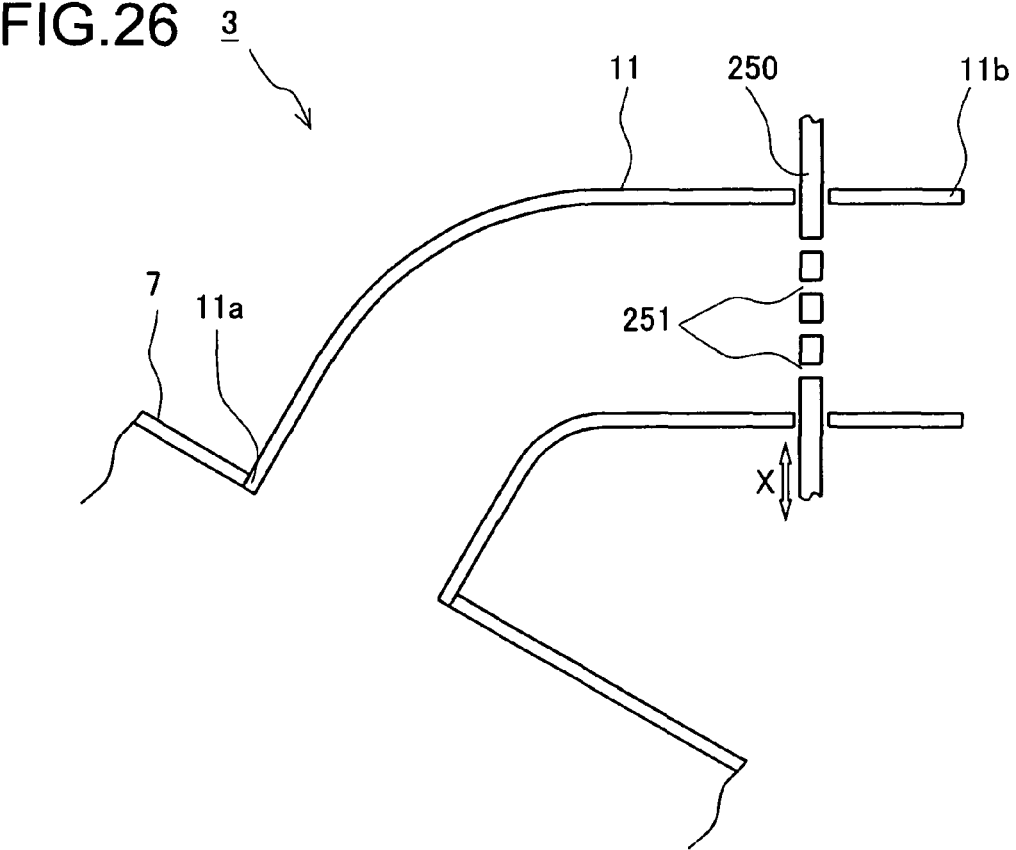
FIG. 26 is a longitudinal cross-sectional view of a necessary portion of a combustor in accordance with a seventeenth embodiment of the present invention.
Figure 27:
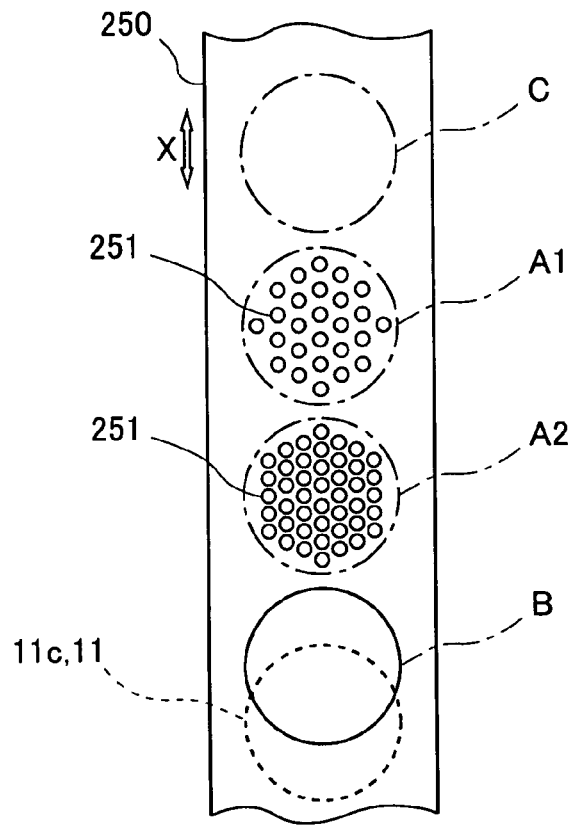
FIG. 27 is a plan view of a plate-type member in a combustor of a seventeenth embodiment.

To put simply, as shown in FIG. 26 and FIG. 27, in accordance with the relevant embodiment, the bypass valve 12 in accordance with the sixteenth embodiment is eliminated, and as a substitute, a plate-type member 250 have a non-through-holes area C formed, which is approximately as large as a transverse cross-section 11c of the bypass duct 11 and has no through-holes 251, in addition to through-holes area A1, A2 . . . and a through-area B.

Being constructed as mentioned above, when the flow of the bypass air is adjusted, the plate-type member 250 is slid to move appropriately and selected so as to have the through-holes areas A1, A2 . . . , through-area B and non-through-holes area C coincide with an area corresponding to the transverse cross-section of the bypass duct 11. By this, the degree of opening and closure of the bypass valve 12 is adjusted, thereby adjusting the flow of the bypass air, which is the original function of the bypass duct 11.

On the other hand, when combustion vibration is to be reduced, the plate-type member 250 is slid to move and selected so as to have through-holes areas A1, A2 . . . , being worth various frequency areas of combustion vibration, coincide with an area corresponding to the transverse cross-section of the bypass duct 11. By this, responsiveness of damping to combustion vibration in the frequency-area thereof is secured, thereby reducing the combustion vibration.

As a result, same as the sixth embodiment, combustion vibration in various frequency areas can surely be reduced without damaging the original function of the bypass duct, and additionally, it is not necessary to install such the bypass valve 12 as in accordance with the sixteenth embodiment separately. In other words, because the function of the bypass valve 12 is shared by the plate-type member 250, there is an advantage that construction is simple.

Figure 28:
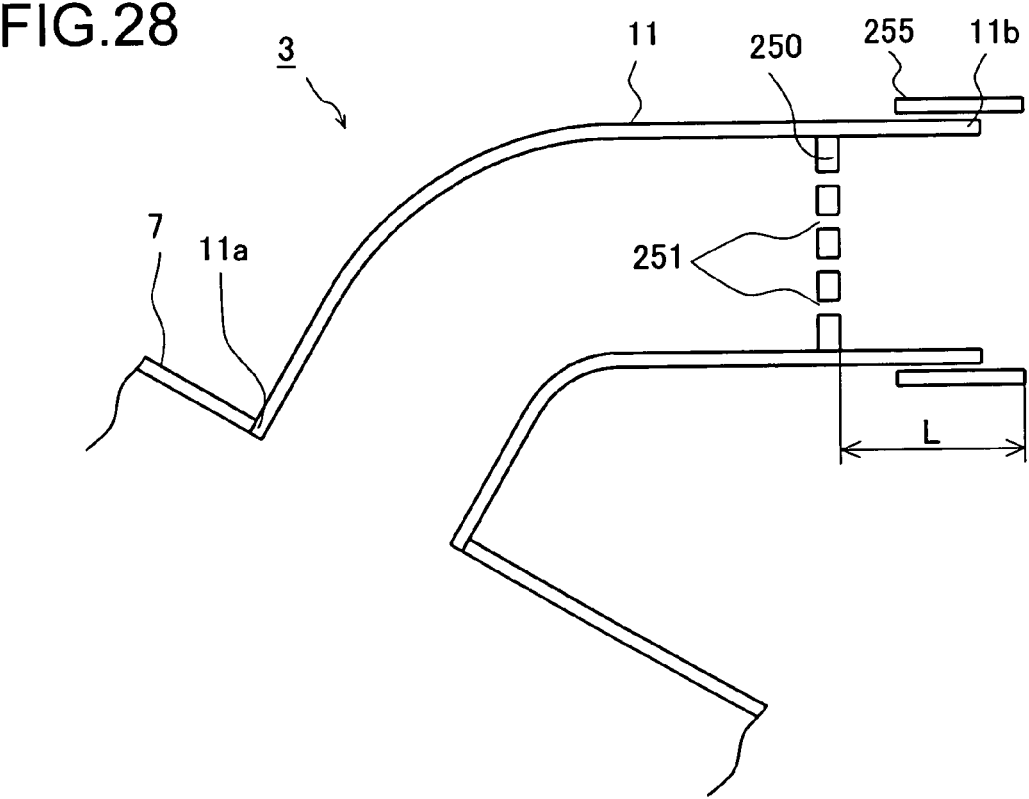
FIG. 28 is a longitudinal cross-sectional view of a necessary portion of a combustor in accordance with an eighteenth embodiment of the present invention.

Next, an eighteenth embodiment of the present invention will be described by referring to FIG. 28. Characteristic of an eighteenth embodiment is that in the combustor 3 in accordance with the fifteenth through seventeenth embodiments, the degree of reduction of combustion vibrations can be adjusted. This is because the degree of reduction of combustion vibration fluctuates in a distance L from an opening end to the casing 5 of the bypass duct 11 (the end 11b in FIG. 19, FIG. 21 and FIG. 26) to the plate-type member 250.

Therefore, in accordance with the relevant embodiment, into the end 11b of the bypass duct 11 is inserted and engaged a cylindrical member 255 being able to protrude axially and having a predetermined length. By this, the cylindrical member 255 is made to protrude, which makes the distance L substantially extend from the plate-type member 250 to the tip of the cylindrical member 255. Therefore, because the distance L can be adjusted freely by adjustment of protruding amount of the cylindrical member 255, it is possible to adjust the degree of a decrease in combustion vibration which fluctuates, depending on the distance L. As a result, setting is possible so as to reduce combustion vibration thoroughly.

Next, a nineteenth embodiment of the present invention will be described by referring to FIG. 29. Characteristic of a nineteenth embodiment is that while in the combustor 3 in accordance with the fifteenth through eighteenth embodiments, the air for resonance inducing vibration of fluid particles serves as the air inside the casing 5, in accordance with the relevant embodiment, the air inside the bypass duct 11 serves as such.

Figure 29:
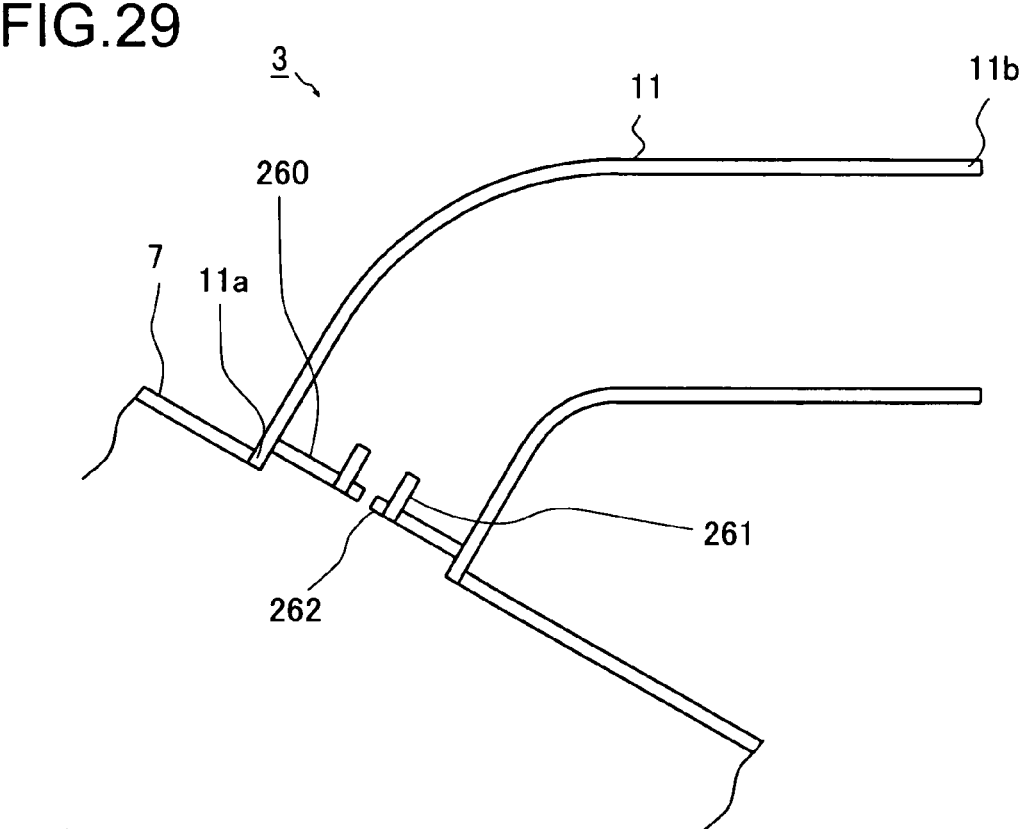
FIG. 29 is a longitudinal cross-sectional view of a necessary portion of a combustor in accordance with a nineteenth embodiment of the present invention.

To put simply, in accordance with the relevant embodiment, as shown in FIG. 29, one end 11a of the bypass duct 11 has a dividing wall 260 installed in the neighborhood thereof so as to cross therein, and the dividing wall 260 has a protruding pipe 261 which penetrates through the dividing wall 260 and protrudes through at least one surface thereof. Furthermore, inside the protruding pipe 261, a resistive element 262 having a multiple number of through-holes is inserted and engaged. For the resistive element 262, for example, a punching metal, ceramic sintered metal or a sintered metallic mesh is applied.

Constructed as described above, the bypass duct 11 functions as an air-container body which accommodates the air for resonance for fluid particles serving as vibration elements of combustion vibration that occurs in a combustion region inside the combustor basket 6. Additionally, a dividing wall 260 and a protruding pipe 261 function as junction bodies which connect the transition piece 7 and the bypass duct 11. Moreover, a resistive element 262 functions as a transverse body which crosses the internal of the protruding pipe 261, and through-holes thereof function as vents where fluid particles are vibrated by resonance with the air inside the bypass duct 11. In this way, as for combustion vibration that occurs in a combustion region inside the combustor basket 6, fluid particles are propagated through the transition piece 7, next introduced from one end 11a of the bypass duct 11 and trapped effectively by the resistive element 262 in the protruding pipe 261, then resonate with the air in a space from the dividing wall 260 to the other end 11b in the bypass duct 11 being connected through the protruding pipe 261, and vibrate in the neighborhood of the resistive element 262. By this vibration, vibration amplitude of the fluid particles is damped and the combustion vibration thereof is reduced. As a result, a stable decrease in NOx is realized.

Additionally, in FIG. 29, one protruding pipe 261 and one resistive element 262 are installed for a dividing wall 260, but needless to say, more than two may be installed in a row.

Next, a twentieth embodiment of the present invention will be described by referring to FIG. 30. Characteristic of a twentieth embodiment is that combustion vibration is reduced efficiently in the combustor 3 in accordance with the nineteenth embodiment.

Figure 30:
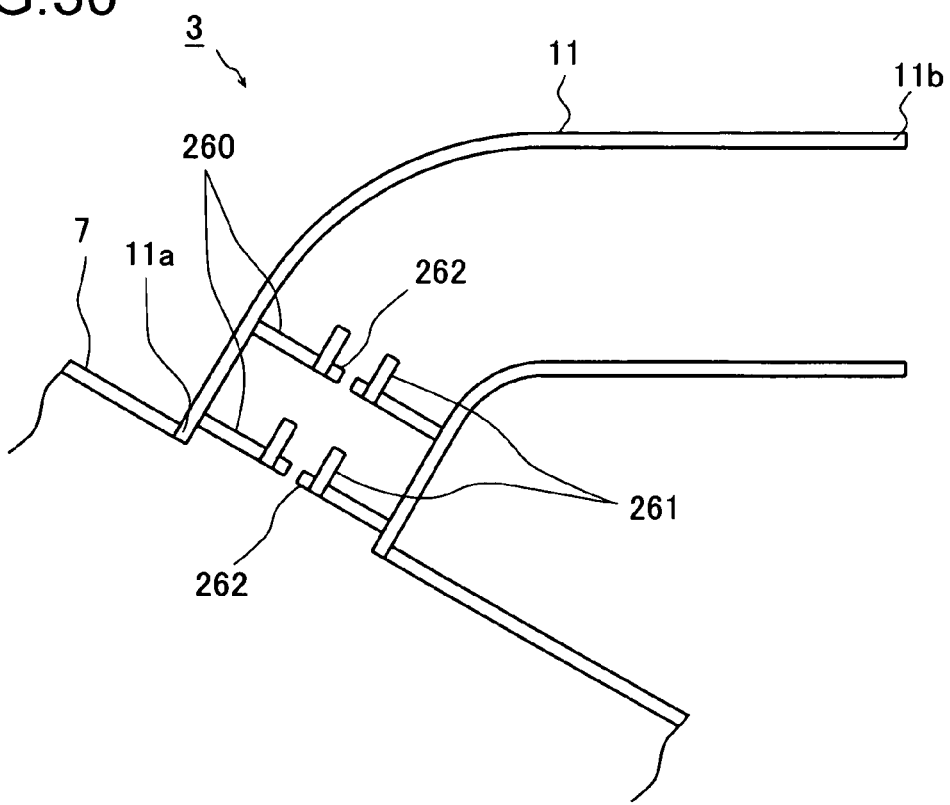
FIG. 30 is a longitudinal cross-sectional view of a necessary portion of a combustor in accordance with a twentieth embodiment of the present invention.

To put simply, in accordance with the relevant embodiment, as shown in FIG. 30, the plurality of dividing walls 260 are installed in a row, and each of these dividing walls 260 is provided with the protruding pipe 261 and the resistive element 262. By this, fluid particles resonate with the air in each of spaces between the dividing walls 260 being connected through each of protruding pipes 261 and vibrate in the neighborhood of each of resistive elements 262, damping the vibration amplitude thereof. Therefore, it is possible to vibrate fluid particles in a multiple number of locations, thereby reducing combustion vibration efficiently.

Figure 31:
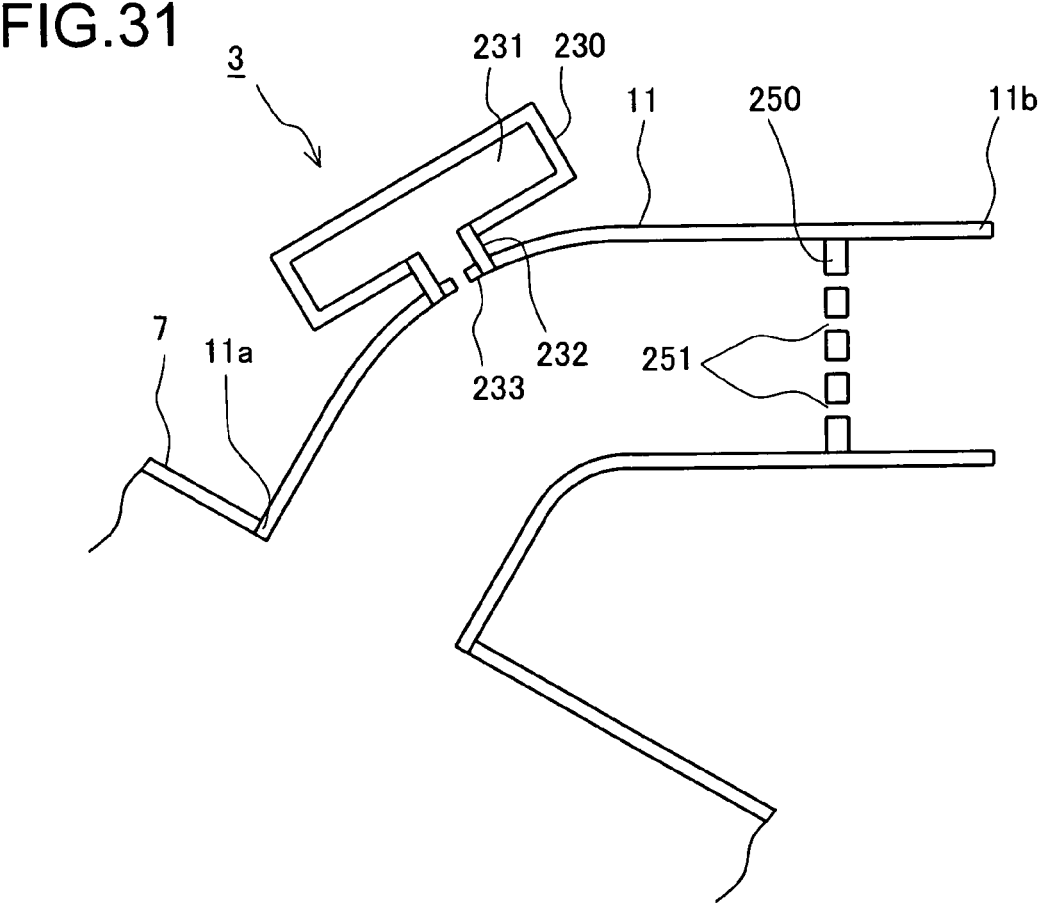
FIG. 31 is a longitudinal cross-sectional view of a necessary portion showing one example of a combustor in accordance with a twenty-first embodiment of the present invention.

Next, a twenty-first embodiment of the present invention will be described. Characteristic of a twenty-first embodiment is that combustion vibration is reduced sufficiently in the combustor 3 in accordance with the fifteenth through twentieth embodiments. FIG. 31 shows an example of construction thereof.

As shown in FIG. 31, in addition to the plate-type member 250 following the fifteenth through eighteenth embodiments, the bypass duct 11 has a box body 230 installed outside a side wall thereof, and a cavity inside the box body 230 forms an internal space 231 having a predetermined capacity. Additionally, the box body 230 is connected to a side wall of the bypass duct 11 through a tubular throat 232 having a predetermined length, and the throat 232 opens to the internal of the bypass duct 11 as well as to an internal space 231.

Furthermore, the throat 232 has a resistive element 233 having a multiple number of through-holes inserted and engaged therein. Same as the resistive element 262 in accordance with the nineteenth and twentieth embodiments, the resistive element 233 is, for example, a punching metal, ceramic sintered metal or a sintered metallic mesh.

Constructed as described above, as for combustion vibration that occurs in a combustion region inside the combustor basket 6, fluid particles vibrate not only in through-holes 251 of a plate-type member 250 but also resonate with the air in an internal space 231 being connected through a throat 232 and vibrate in the neighborhood of a resistive element 233 in the throat 232, thereby damping the vibration amplitude thereof. As a result, combustion vibration can be reduced more sufficiently.

In addition, in FIG. 31, construction following the fifteenth through eighteenth embodiments serves as a basis, and the box body 230 and the like which are characteristic components of the relevant embodiment are added thereto. However, needless to say, addition may be made to a construction following a nineteenth and twentieth embodiments. Also, an object which is connected through a throat 232 is not limited to a wall surface of the bypass duct 11 but may be a wall surface of the combustor basket 6 or the transition piece 7.

Figure 32:
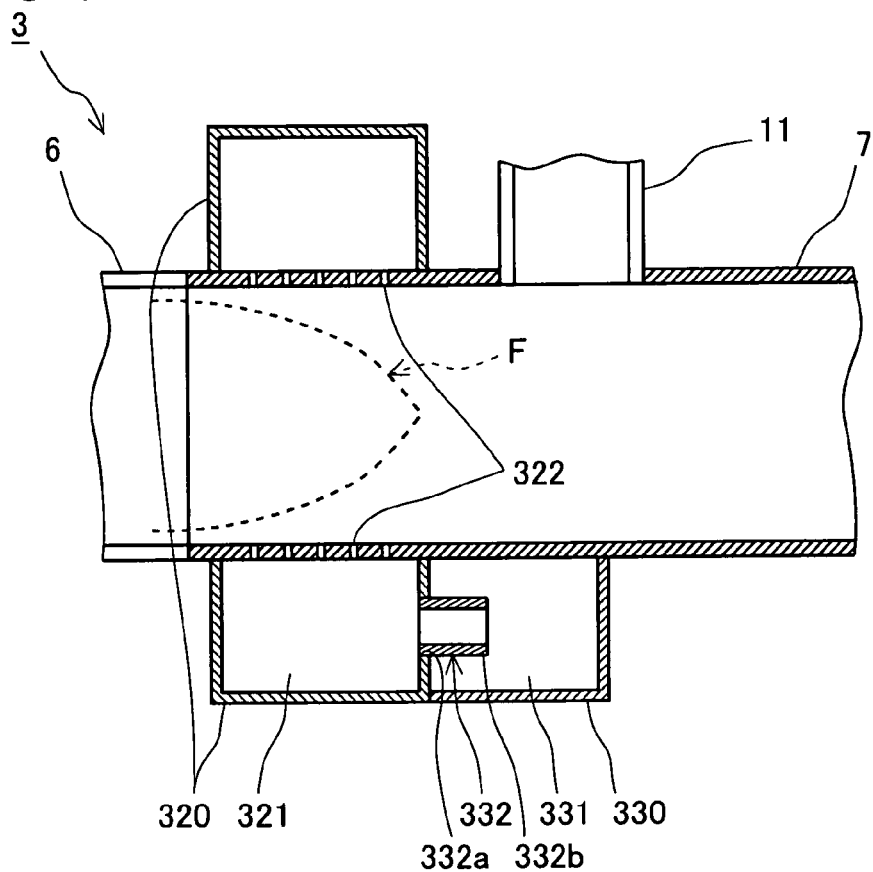
FIG. 32 is a longitudinal cross-sectional view of a necessary portion of a combustor in accordance with a twenty-second embodiment of the present invention.
Figure 33:
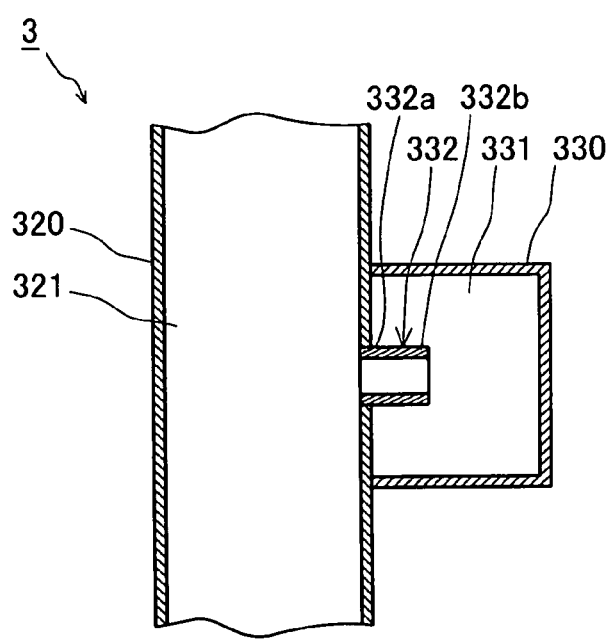
FIG. 33 is a projected cross-sectional view of a resonator and a first box body in a combustor in accordance with a twenty-second embodiment that are cut circumferentially and developed.

Subsequently, a twenty-second through thirty-first embodiments of the present invention will be described sequentially by referring to the drawings. FIG. 32 is a longitudinal cross-sectional view of a necessary portion of a combustor in accordance with a twenty-second embodiment of the present invention, and FIG. 33 is a projected cross-sectional view of a resonator and a first box body of the combustor that are cut circumferentially and developed. Additionally, in the drawings, same symbols will be supplied to portions which have same name and same function as in FIG. 47 and the overlapping explanations will be omitted. The same will apply to a twenty-third through thirty-first embodiments of the present invention to be hereinafter described.

A combustor 3 in accordance with a twenty-second embodiment is applied to a gas turbine shown in FIG. 47. As shown in FIG. 32, a cylinder body is constructed by having the transition piece 7 connected to the front end of the combustor basket 6 and has a combustion region F where combustion vibration is generated with combustion gas inside the cylinder body. The bypass duct 11 is connected to the side wall of the transition piece 7, and one end thereof opens to the internal of the transition piece 7 and the other end opens to the casing 5 (not illustrated) forming a periphery of the cylinder body.

Around the outer circumference of the side wall in the neighborhood of the combustion region F in the transition piece 7 is installed a resonator 320 (sometimes referred as "acoustic liner" hereinafter), and a cavity 321 is formed by a side wall, front-end wall and rear-end wall of the acoustic liner 320 and a side wall of the transition piece 7. Moreover, on a side wall of the transition piece 7 are formed a plurality of sound-absorption holes 322 penetrating from the internal thereof through the cavity 321, so as to be arranged regularly.

In addition, as shown in FIG. 32 and FIG. 33, outside of the front-end wall of the acoustic liner 320 is installed a first box body 330 so as to be located adjacent, along a side wall of the transition piece 7. A first internal space 331 having a predetermined capacity is formed by the side wall and the front-end wall of the first box body 330, the front-end wall of the acoustic liner 320 and the side wall of the transition piece 7. Additionally, the front-end wall of the acoustic liner 320 has a first throat 332 having a predetermined length installed so as to protrude toward the first internal space 331, and the first throat 332 has one end 332a open to a cavity 321 of the acoustic liner 320 and has the other end 332b open to the first internal space 331.

Constructed as described above, the first box body 330 functions as an air-container body which accommodates the air for resonance for fluid particles serving as vibration elements in a low-frequency area of combustion vibration that occurs in a combustion region inside the combustor basket 6. Additionally, the acoustic liner 320 and the first throat 332 function as junction boxes which connect a transition piece 7 and the first box body 330. Moreover, a side wall of the transition piece 7 functions as a transverse body which crosses the internal of the acoustic liner 320, and further, through-holes 322 thereof function as vents where fluid particles in a low-frequency area are vibrated by resonating with the air inside the first box body 330. In this way, as for combustion vibration that occurs in a combustion region F, fluid particles serving as vibration elements in a high-frequency area of combustion vibration resonate with the air in a cavity 321 inside the acoustic liner 320 and vibrate through the sound-absorption holes 322, thereby damping the vibration amplitude thereof.

On the other hand, fluid particles serving as vibration elements in a low-frequency area resonate with the air inside the first internal space 331 through the cavity 321 and the first throat 332 and vibrate through the sound-absorption holes 322, thereby damping the vibration amplitude thereof. In this way, combustion vibration is reduced, regardless of frequency areas, and as a result, a stable decrease in NOx is realized.

Additionally, in FIG. 32 and FIG. 33, one first throat 332 is installed for the first box body 330, but needless to say, more than two may be installed.

Next, a twenty-third embodiment of the present invention will be described by referring to FIG. 34 and FIG. 35. Characteristic of a twenty-third embodiment is that adverse effect on combustion vibration especially in a high-frequency area is avoided in the twenty-second embodiment. This is because in addition to expected resonance with the air in a cavity 321 inside an acoustic liner 320, fluid particles in a high-frequency area sometimes resonate with the air in a first internal space 331 through a first throat 332, and in such a case, vibration of fluid particles in sound-absorption holes 322 becomes insufficient, degrading an effect to reduce combustion vibration in a high-frequency area.

Figure 34:
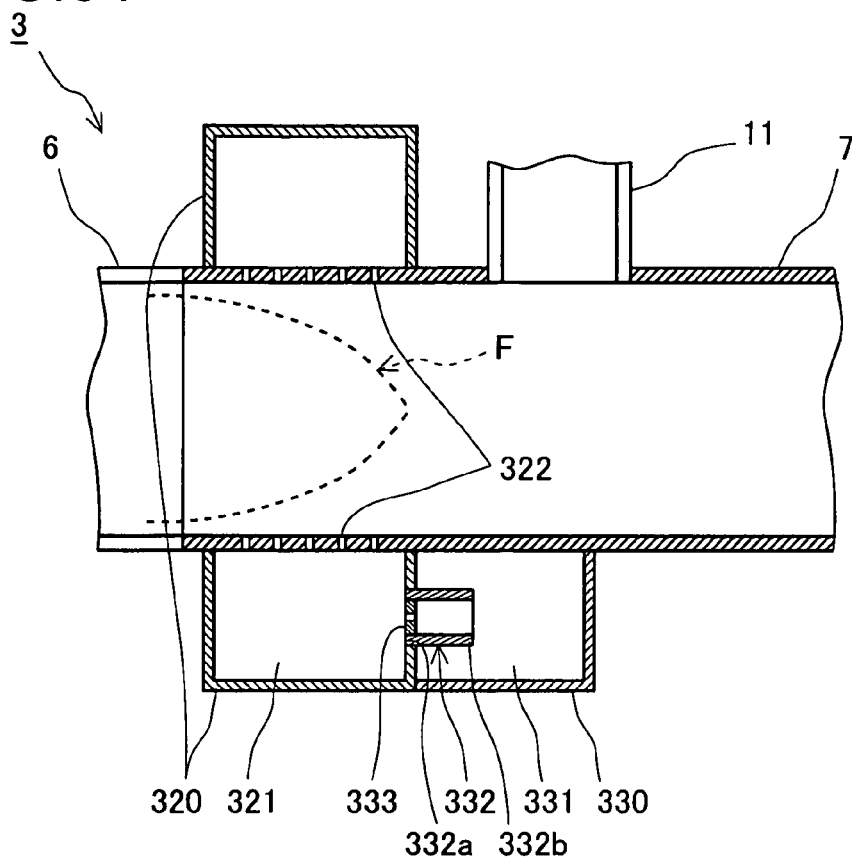
FIG. 34 is a longitudinal cross-sectional view of a necessary portion of a combustor in accordance with a twenty-third embodiment of the present invention.
Figure 35:
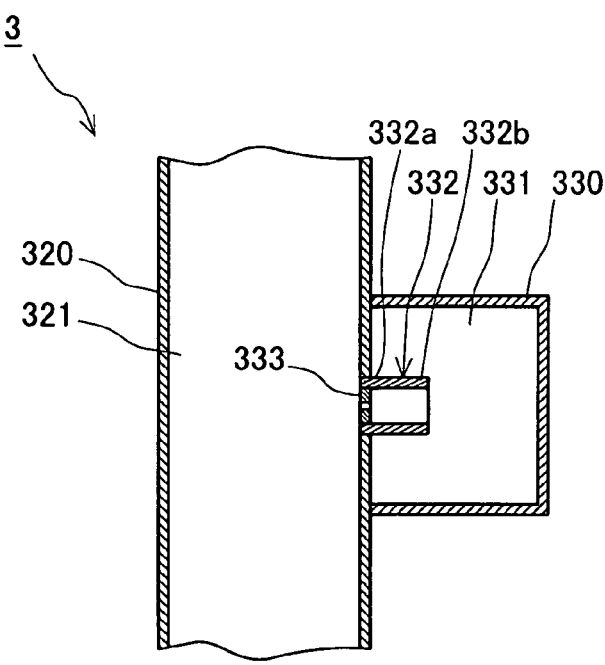
FIG. 35 is a projected cross-sectional view of a resonator and a first box body in a combustor in accordance with a twenty-third embodiment that are cut circumferentially and developed.

Therefore, according to the relevant embodiment, as shown in FIG. 34 and FIG. 35, the first throat 332 has a first resistive element 333 having a multiple number of through-holes inserted and engaged to one end 332a thereof. The first resistive 333 is for example, a punching metal, ceramic sintered metal or sintered metallic mesh.

Constructed as described above, the first resistive element 333 plays a role as a barrier so as to restrain resonance with the air inside the first internal space 331. By this, resonance with the air in a cavity 321 inside the acoustic liner 320 is secured, and in consequence, fluid particles effectively vibrate through the sound-absorption holes 322, thereby damping the vibration amplitude thereof. In addition, for combustion vibration in a low-frequency area, resonance with the air in the first internal space 331 is secured, and fluid particles are effectively trapped by the first resistive element 333 serving as resistance, and vibrate in the neighborhood thereof, thereby damping the vibration amplitude thereof.

Next, a twenty-fourth embodiment of the present invention will be described by referring to FIG. 36 and FIG. 37. Characteristic of a twenty-fourth embodiment is that consideration is given especially to combustion vibration in a low-frequency area in the twenty-third embodiment. When combustion vibration occurs in a low-frequency area, it is necessary to make a cross-sectional area in the first throat 332 in accordance with the twenty-second embodiment smaller. However, if doing so, an area where the first resistive element 333 exists inevitably becomes smaller, which reduces the ratio of trapping of fluid particles, contributing insufficiently to a decrease in combustion vibration as a whole.

Figure 36:
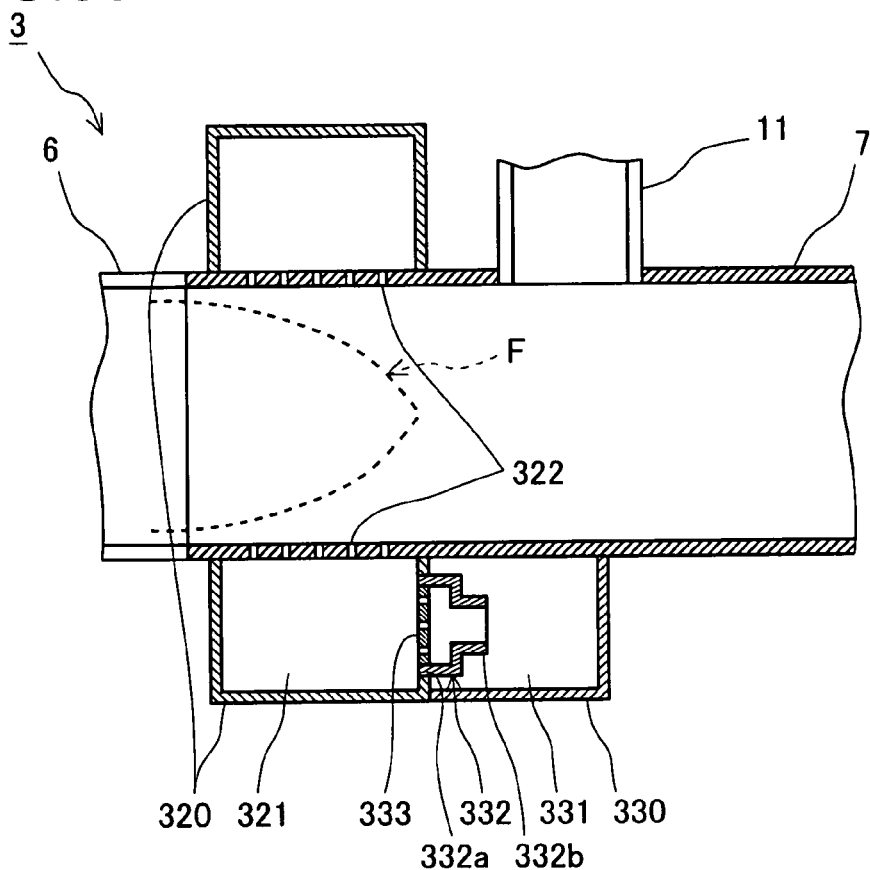
FIG. 36 is a longitudinal cross-sectional view of a necessary portion of a combustor in accordance with a twenty-fourth embodiment of the present invention.
Figure 37:
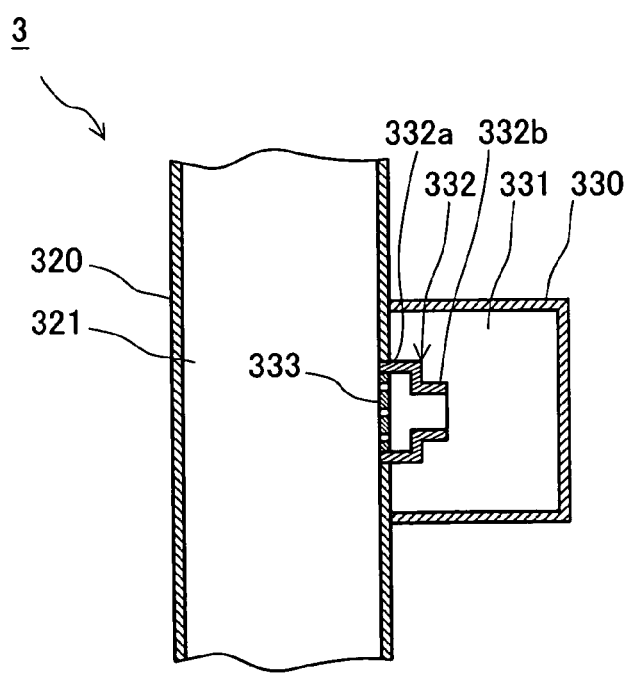
FIG. 37 is a projected cross-sectional view of a resonator and a first box body in a combustor in accordance with a twenty-fourth embodiment that are cut circumferentialy and developed.

Therefore, in accordance with the relevant embodiment, as shown in FIG. 36 and FIG. 37, such a stepped tubular object is applied for the first throat 332 as the inner circumference thereof is rapidly spread from one end 332b to the other end 332a in the neighborhood of the center, and an area of an opening of one end 332a is larger than that of the other end 332b. The end 332a has a first resistive element 333 inserted and engaged.

Because in this way, it is possible to make the cross-sectional area of the internal of the first throat 332, namely the other end 332b, smaller and at the same time it is possible to expand an area where the first resistive element 333 exists, the ratio of trapping of fluid particles in a low-frequency area is increased, thereby contributing sufficiently to reduction of combustion vibration as a whole. As a result, it is possible to reduce thoroughly combustion vibration in a low-frequency area as a whole.

Additionally, when a trumpet-like object whose inner circumference gradually expands is applied as the first throat 332, same effects can be obtained.

Next, a twenty-fifth embodiment of the present invention will be described by referring to FIG. 38 and FIG. 39. Characteristic of a twenty-fifth embodiment is that consideration is given to an adverse effect caused in accordance with the twenty-fourth embodiment. When the opening area of one end 332a of the first throat 332 is larger than that of the other end 332b as in accordance with the twenty-fourth embodiment, in other words, when the capacity inside the first throat 332 becomes larger, sometimes no phase difference of each of pressure fluctuations occurs between a space inside the first throat 332 being isolated by the first resistive element 333 and a cavity 321 inside an acoustic liner 320. In such a case, because fluid particles do not vibrate in the neighborhood of the first resistive element 333, such an adverse effect is caused as combustion vibration in a low-frequency are cannot be reduced sufficiently if nothing is done.

Figure 38:
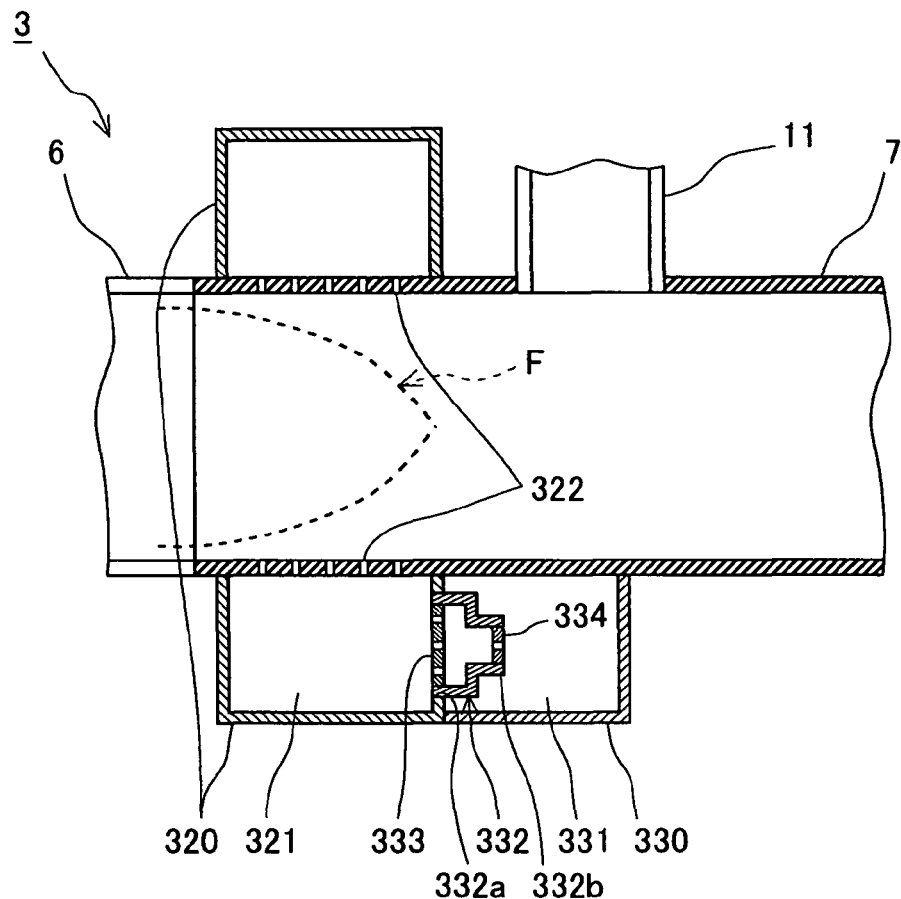
FIG. 38 is a longitudinal cross-sectional view of a necessary portion of a combustor in accordance with a twenty-fifth embodiment of the present invention.
Figure 39:
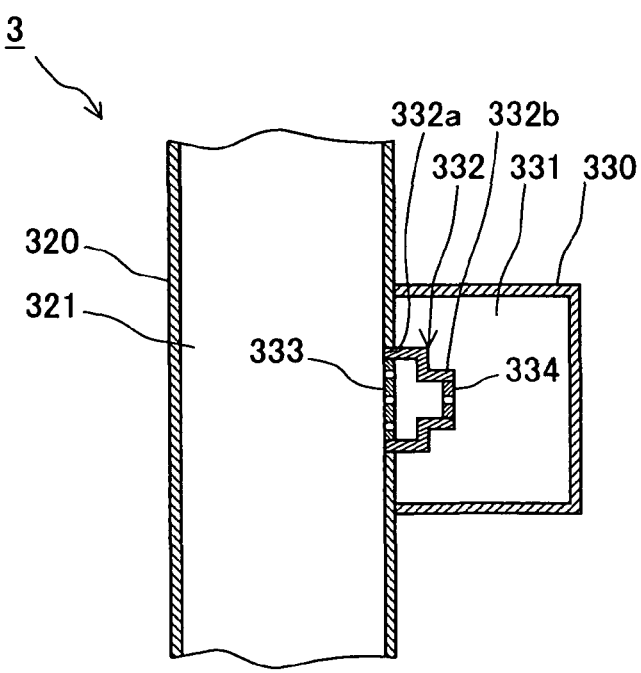
FIG. 39 is a projected cross-sectional view of a resonator and a first box body in a combustor in accordance with a twenty-fifth embodiment that are cut circumferentially and developed.

Therefore, in accordance with the relevant embodiment, as shown in FIG. 38 and FIG. 39, one end 332b of the first throat 332 has a resistive element 334 having a multiple number of through-holes inserted and engaged. Same as the first resistive elements 333, the resistive element 334 is, for example, a punching metal, ceramic sintered metal or a sintered metallic mesh.

Constructed as described above, because a phase difference of each of pressure fluctuations occurs between a first internal space 331 and a space inside the first throat 332, in order to make fluid particles vibrate effectively in the neighborhood of a resistive element 334, by utilizing this, combustion vibration in a low-frequency area can be reduced sufficiently, although vibration of fluid particles in the neighborhood of the first resistive element 333 is insufficient.

Moreover, same effect can be obtained although the resistive element 334 is installed to either side of the end 332b which has a smaller cross-sectional area than the other end 332a of the first throat 332.

Next, a twenty-sixth embodiment of the present invention will be described by referring to FIG. 40. Characteristic of a twenty-sixth embodiment is that combustion vibration in a low-frequency area is reduced more sufficiently, and a plurality of first box bodies 330 and the like serving as major components of the twenty-second through twenty-fifth embodiments are installed in parallel to the acoustic liner 320.

Figure 40:
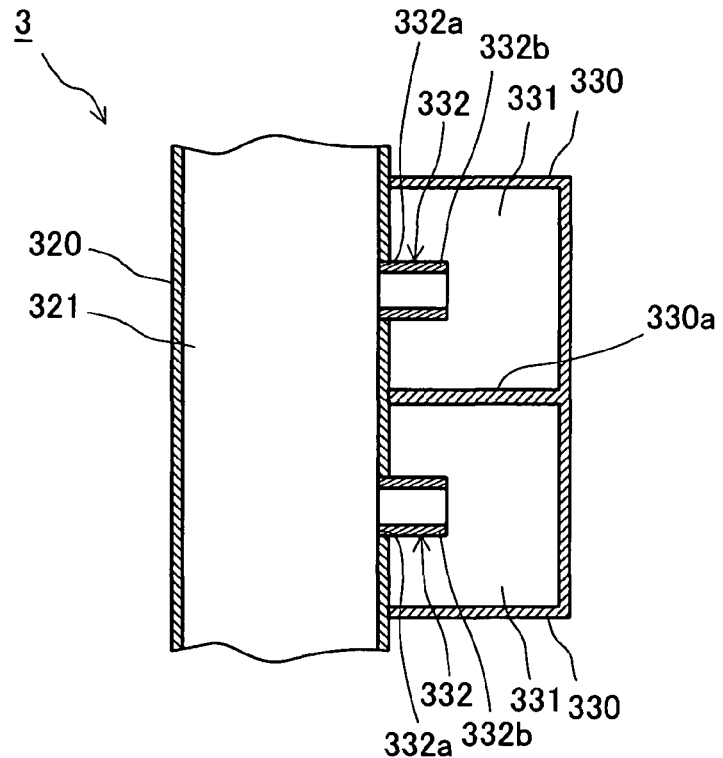
FIG. 40 is a projected cross-sectional view of a resonator and a first box body in a combustor in accordance with a twenty-sixth embodiment of the present invention that are cut circumferentially and developed.

To put simply, as shown in FIG. 40, outside the front-end wall of the acoustic liner 320 are installed two first box bodies 330 being installed in parallel in a circumferential direction along a side wall of the transition piece 7, so as to be located adjacent to each other. Each of first internal spaces 331 being formed by each of first box bodies 330 open to a cavity 321 of the acoustic liner 320 through the first throat 332 being installed respectively.

By this, it is possible to substantially expand the capacity of the first internal space 331 as a whole, thereby enhancing efficiency of resonance with the air in the first internal space 331 for combustion vibration in a low-frequency area. As a result, vibration efficiency of fluid particles being caused by this resonance is enhanced, thereby making it possible to reduce combustion vibration in a low-frequency area more sufficiently as a whole.

Here, in FIG. 40, two sets of first box bodies 330 and the like in accordance with the twenty-second embodiment are installed in parallel for an acoustic liner 320. Needless to say, more than those may be installed in parallel, and a plurality of first box bodies 330 and the like in accordance with the twenty-third through twenty-fifth embodiments may be installed in parallel. Additionally, each of first box bodies 330 has a first wall surface 330a being shared to be used for forming a first internal space 331 thereof respectively and is directly adjoining to each other across the first wall surface 330a, but may be placed adjoining independently.

In addition, when the opening area or the length of each of ends 332b of the first throat 332, or the capacity of each of first internal spaces 331 being formed by each of first box bodies 330 is determined appropriately in advance so as to be mutually different, vibration properties responding to each of first box bodies 330 and the like will differ, so that it is possible to respond to various combustion vibrations in different frequency areas without fail.

Next, a twenty-seventh embodiment of the present invention will be described by referring to FIG. 41. Characteristic of a twenty-seventh embodiment is that a phase difference of pressure fluctuation in a cavity 321 inside the acoustic liner 320 in accordance with the twenty-sixth embodiment is restrained from occurring. In accordance with the twenty-sixth embodiment, a phase difference of pressure fluctuation occurs in the cavity 321 itself, and in such a case, vibration of fluid particles through sound-absorption holes 322 becomes insufficient in combustion vibration in a high-frequency area, and vibration of fluid particles through sound-absorption holes 322 and vibration of fluid particles in the neighborhood of the first resistive element 333 or the resistive element 334 become insufficient in combustion vibration in a low-frequency area, which cannot reduce combustion vibration sufficiently if nothing is done.

Figure 41:
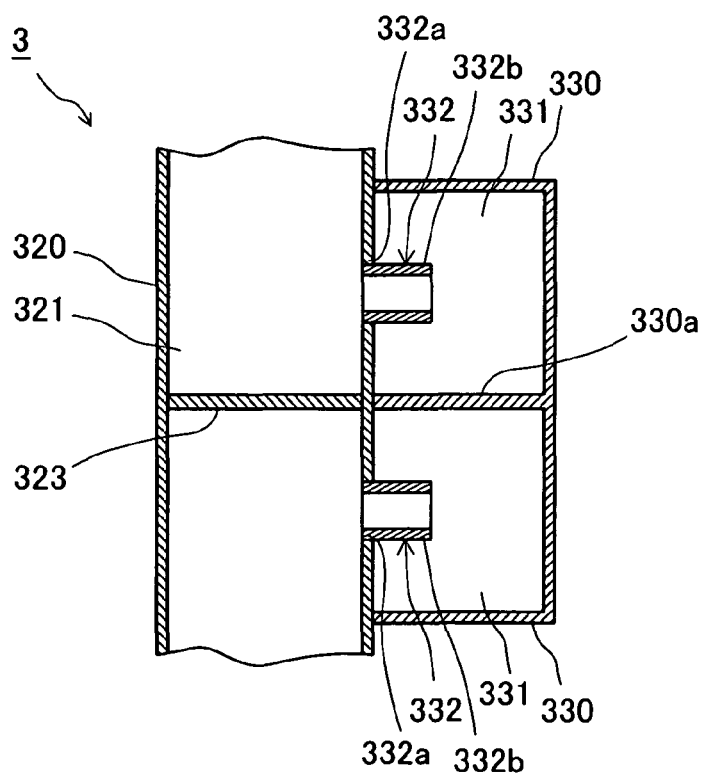
FIG. 41 is a projected cross-sectional view of a resonator and a first box body in a combustor in accordance with a twenty-seventh embodiment of the present invention that are cut circumferentially and developed.

Therefore, in accordance with the relevant embodiment, as shown in FIG. 41, a dividing wall 323 is installed respectively between each of ends 332a of each of first throats 332 in the cavity 321 of the acoustic liner 320.

Constructed as described above, the cavity 321 is divided by the dividing wall 323 for every first throat 332, thereby making it possible to restrain a phase difference of pressure fluctuation in an individual divided space from occurring. As a result, in combustion vibration in a high-frequency area, fluid particles vibrate effectively through sound-absorption holes 322, and in combustion vibration in a low-frequency area, fluid particles vibrate through sound-absorption holes 322 and vibrate in the neighborhood of the first resistive element and the like effectively, thereby making it possible to reduce combustion vibration thoroughly.

Next, a twenty-eighth embodiment of the present invention will be described by referring to FIG. 42. Characteristic of a twenty-eight embodiment is to effectively utilize a phase difference of pressure fluctuation in a cavity 321 inside an acoustic liner 320 that may occur in the twenty-seventh embodiment while it is restrained in the above-mentioned twenty-seventh embodiment.

Figure 42:
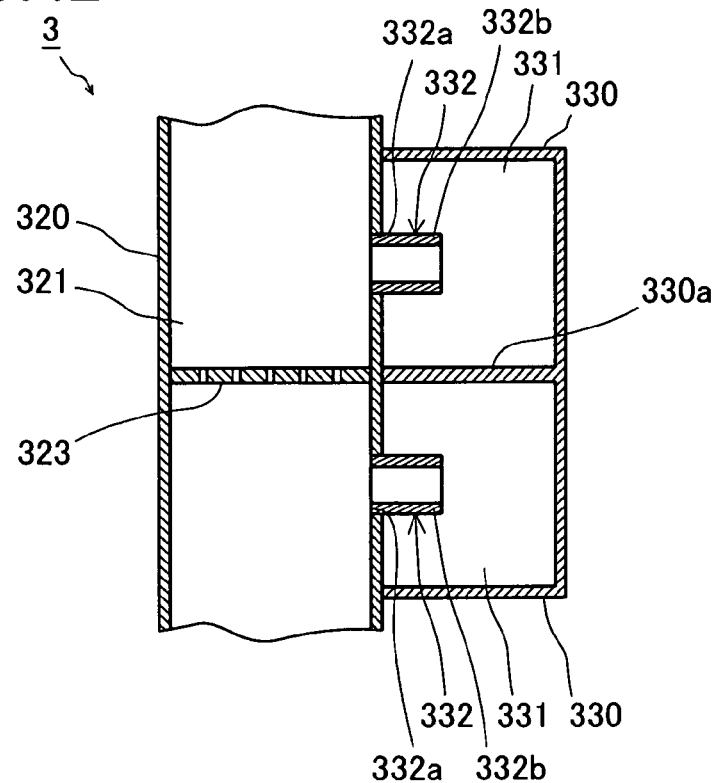
FIG. 42 is a projected cross-sectional view of a resonator and a first box body in a combustor in accordance with a twenty-eighth embodiment of the present invention that are cut circumferentially and developed.

To put simply, as shown in FIG. 42, dividing walls 323 being installed in a cavity 321 inside the acoustic liner 320 in accordance with the twenty-sixth embodiment has a multiple number of through-holes formed therein, and these dividing walls 323 play a role as resistive elements. By this, compared with mutual pressure fluctuation, a phase difference occurs substantially between adjoining divided spaces inside the acoustic liner 320 being separated by the dividing walls 323. As a result, fluid particles begin to vibrate effectively through through-holes of the dividing walls 323, thereby making it possible to reduce combustion vibration more sufficiently.

Next, a twenty-ninth embodiment of the present invention will be described by referring to FIG. 43. Characteristic of a twenty-ninth embodiment is that combustion vibration in a low-frequency area is reduced more sufficiently, by effectively utilizing a phase difference of pressure fluctuation that may occur between first box bodies 330 adjoining each other in the twenty-sixth through twenty-eighth embodiment.

Figure 43:
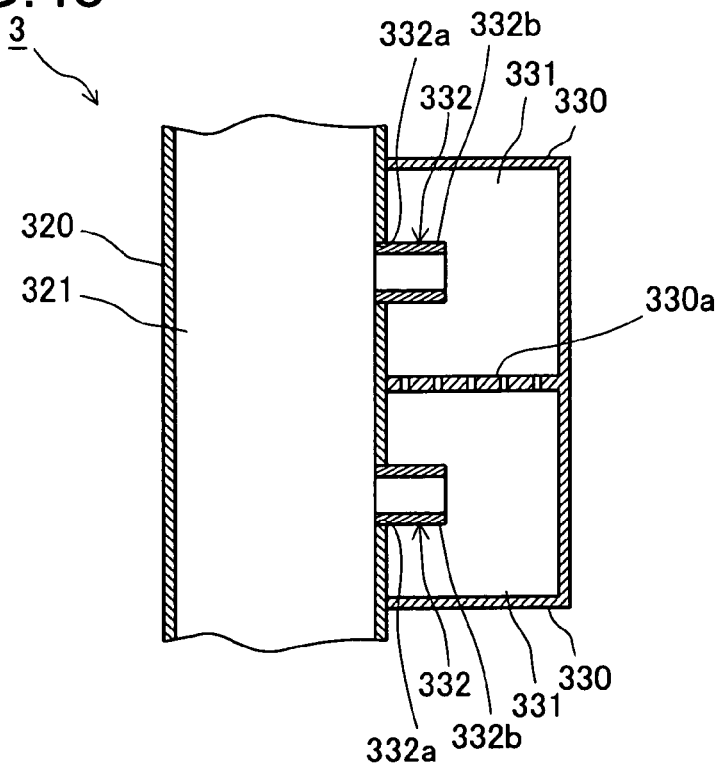
FIG. 43 is a projected cross-sectional view of a resonator and a first box body in a combustor in accordance with a twenty-ninth embodiment of the present invention that are cut circumferentially and developed.

To put simply, as shown in FIG. 43, among wall surfaces of each of first box bodies 330, a first wall surface 330a, being shared and used for forming a first internal space 331, has a multiple number of through-holes formed, and this first wall surface 330a serves as a resistive element. By this, the first internal spaces 331 being isolated by the first wall surface 330a and adjoining each other has a phase difference produced substantially when pressure fluctuations thereof are compared with each other. As a result, fluid particles effectively vibrate through through-holes of the first wall surface 330a, thereby making it possible to reduce combustion vibration in a low-frequency area more sufficiently.

Next, a thirtieth embodiment of the present invention will be described by referring to FIG. 44. Characteristic of a thirtieth embodiment is that in addition to a problem of combustion vibration, the following problems specific to a combustor 3 are solved.

First problem is that because of having a combustion region F inside, the combustor basket 6 and the transition piece 7 which serve as cylinder bodies having a resonator 3 installed around the outer circumference thereof are subject to an environment of continually heating, which eventually results in heating of the acoustic liner 320 and the first box body 330. Therefore, it is required to prevent these cylinder body, acoustic liner 320 and the like from being subject to excessive increase in temperature.

Second problem is that sometimes a part of combustion gas being generated in a combustion region F in a cylinder body flows into the internal of the acoustic liner 320 or internal of the first box body 330 by way of sound-absorption holes 322 and further through the first throat 332. In such a case, a fuel and water vapor being contained in a part of combustion gas is liquefied and accumulates inadvertently. Therefore, it is required to discharge this inadvertent stagnant liquid outside the acoustic liner 320 and the first box body 330.

Figure 44:
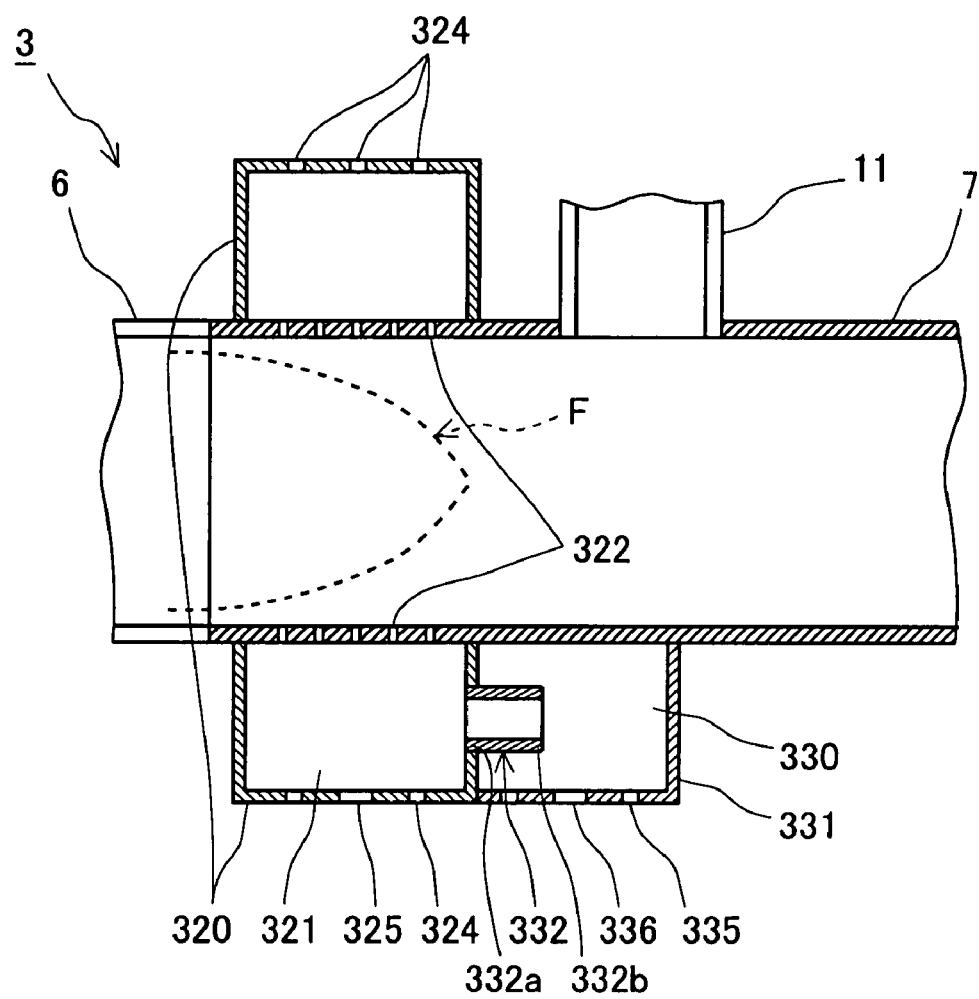
FIG. 44 is a longitudinal cross-sectional view of a necessary portion of a combustor in accordance with a thirtieth embodiment of the present invention.

Therefore, as shown in FIG. 44, in accordance with the relevant embodiment, the acoustic liner 320 and the first box body 330 have a plurality of fluid-introducing holes 324 for cooling of the acoustic liner and a plurality of fluid-introducing holes 335 for cooling of the first box body formed therein, which introduce from outside to inside respectively the cooling fluid, namely the compressed air flowing into the internal of the casing 5 from the compressor 2. By this, the acoustic liner 320 and the first box body 330 are directly cooled, and at the same time the combustor basket 6 and the transition piece 7 serving as cylinder bodies are indirectly cooled. As a result, it becomes possible to prevent an excessive increase in temperature being caused by combustion, thereby solving the above-mentioned first problem.

Additionally, the vertically lowest portion of the acoustic liner 320 and the first box body 330 have a drain hole 325 for the acoustic liner and a drain hole 336 for the first box body, which discharge stagnant liquid from inside to outside respectively. By this, it is possible to discharge outside inadvertent stagnant liquid being accumulated inside the acoustic liner 320 and the first box body 330, thereby solving the above-mentioned second problem.

Next, a thirty-first embodiment of the present invention will be described by referring to FIG. 45 and FIG. 46. Characteristic of a thirty-first embodiment is that combustion vibration is reduced more efficiently. Therefore, a first box body 330 and the like serving as major components of the above-mentioned twenty-second through thirtieth embodiments are installed in such a manner as if a plurality are installed in a row.

Figure 45:
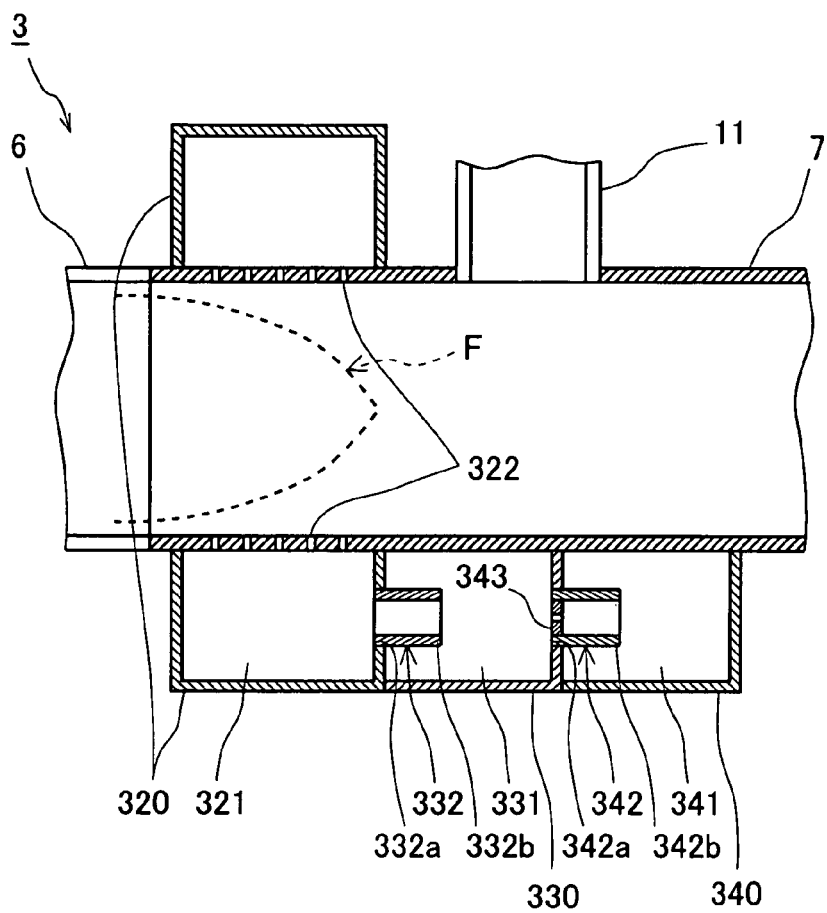
FIG. 45 is a longitudinal cross-sectional view of a necessary portion of a combustor in accordance with a thirty-first embodiment of the present invention.
Figure 46:
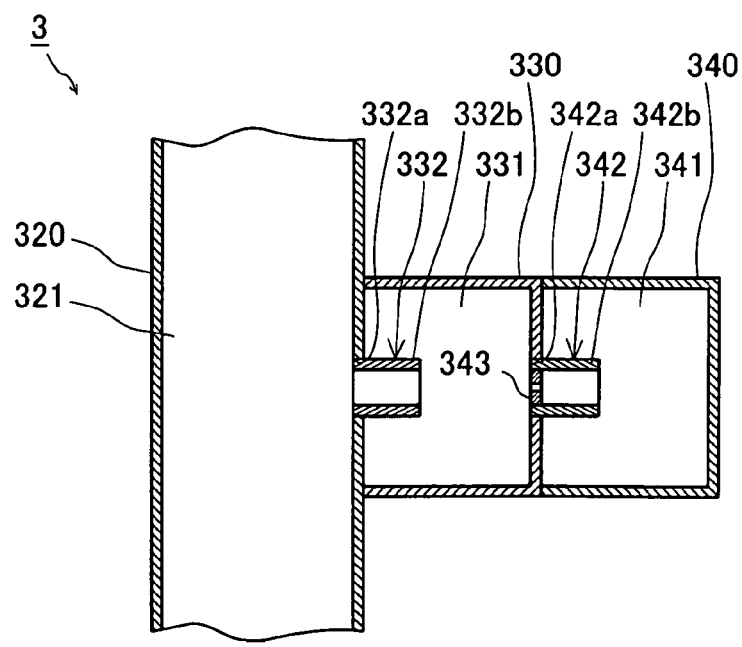
FIG. 46 is a projected cross-sectional view of a resonator and a first box body in a combustor in accordance with a thirty-first embodiment that are cut circumferentially and developed.

To put simply, in accordance with the relative embodiment, as shown in FIG. 45 and FIG. 46, outside a front-end wall of the first box body 330, is installed in a row along a side wall of the transition piece 7 a second box body 340 being similar to a first box body 330; and a side wall and the front-end wall of the second box body 340, the front-end wall of the first box body 330 and a side wall of the transition piece 7 have a second internal space 341 having a predetermined capacity formed. Furthermore, the front-end wall of the first box body 330 has a second throat 342 having a predetermined length installed thereto, protruding toward the second internal space 341. The second throat 342 has one end 342a located on a side of the first box body 330 open to the first internal space 331 and has the other end 342b located on a side of the second box body 340 open to the second internal space 341.

Additionally, the second throat 342 has a second resistive element 343 having a multiple number of through-holes inserted and engaged to an end 342a thereof. Same as the first resistive element 333, the second resistive element 343 is, for example, a punching metal, a ceramic sintered metal or sintered metallic mesh. Moreover, in FIG. 45 and FIG. 46, a second box body 340 and the like are added to construction in accordance with the twenty-second embodiment (See FIG. 32 and FIG. 33.), but needless to say, may be added to construction in accordance with the twenty-third through thirtieth embodiments (FIG. 34 through FIG. 44.).

By this, fluid particles in a low-frequency area not only vibrate through sound-absorption holes 322 or vibrate in the neighborhood of the first resistive element 333 and the like but also resonate with the air in the second internal space 341 so as to vibrate in the neighborhood of the second resistive element 343, thereby damping the vibration amplitude thereof. As a result, fluid particles can vibrate in a multiple number of locations, which makes it possible to efficiently reduce combustion vibration in a low-frequency area.

Additionally, in FIG. 45 and FIG. 46, one second box body 340 is installed in a row for the first box body 330, but needless to say, more than two may be installed in a row. In such a case, it is only to directly connect the second internal spaces 341 in the adjoining second box bodies 340 through the above-mentioned second throat 342 respectively.

Moreover, same as concepts of the twenty-fourth through twenty-sixth embodiments, considering sufficient response to combustion vibration in a low-frequency area, the following modifications are possible. Following the first throat 332 in accordance with the twenty-fourth embodiment, an opening area of one end 342a of the second throat 342 is larger than that of the other end 342b. Following the resistive element 334 of the first throat 332 in accordance with the twenty-fifth embodiment, one end 342b of the second throat 342 has a resistive element having a multiple number of through-holes inserted and engaged. Following the first box body 330 in accordance with the twenty-sixth embodiment, a plurality of second box bodies 340 and the like are installed in parallel.

Furthermore, same as a concept of the twenty-ninth embodiment, in order to utilize a phase difference of pressure fluctuation between adjoining second box bodies 340 being installed in parallel, each of adjoining second box bodies 340 being installed in parallel has a second wall surface 340a which is shared so as to form a second internal space 341 mutually, and the second wall surface 340a can have a multiple number of through-holes as resistive elements.

In addition, same as a concept of the thirtieth embodiment, in order to solve a problem peculiar to a combustor 3, the second box body 340 has a plurality of fluid-introducing holes for cooling of a second box body, introducing the cooling fluid from outside to inside, formed therein, and furthermore, has a drain hole for the second box body, discharging stagnant liquid from inside to outside, formed therein.

Moreover, in accordance with the twenty-second through thirty-first embodiments, a shape of a transverse cross-section of the first throat 331 or the second throat 341 is not limited to a circle but may be a polygon. In addition, the first box body 330 or the second box body 340 may have the first internal space 331 or the second internal space 341 formed by an internal cavity respectively. In such a case, it is only to directly connect to the acoustic liner 320 or the first box body 330 through the first throat 332 or the second throat 342 respectively.

While the invention has been described in connection with what is presently considered to be the most practical and preferred embodiment, it is to be understood that the invention is not to be limited to the disclosed embodiments or an example to which these embodiments are applied concretely, but on the contrary, is intended to cover various modifications and equivalent arrangements included within the spirit and scope of the appended claims.

INDUSTRIAL APPLICABILITY

As described above, the present invention is useful for a gas turbine combustor and a gas turbine for which realization of reduction of NOx is desired.

What is claimed is:

1. A gas turbine combustor having a cylinder body, comprising:
an air-container body which accommodates air for resonance for fluid particles serving as vibration elements of combustion vibration;
a resonator having an internal cavity which is installed around a periphery of the cylinder body and which is arranged so as to communicate with the cylinder body through sound-absorption holes; and
a first throat having a predetermined length which has one end opening to the internal cavity of the resonator and which has another end opening to the air-container body,
wherein the air-container body forms a closed space excluding an opening only through the first throat,
wherein the air-container body is disposed on the periphery of the cylinder body so as to be adjacent to the resonator, and a longitudinal direction of the first throat is transverse with respect to a longitudinal direction of each of the sound-absorption holes.

2. A gas turbine combustor as described in claim 1, wherein said first throat has a first resistive element inserted into and engaged with said one end of said first throat, said first resistive element having a multiple number of through-holes.

3. A gas turbine combustor as described in claim 2, wherein an opening area of said one end of said first throat is larger than that of said another end of said first throat.

4. A gas turbine combustor as described in claim 3, wherein said first throat has a second resistive element inserted into and engaged with said another end of said first throat, said second resistive element having a multiple number of through-holes.

5. A gas turbine combustor as described in claim 1, wherein said air-container body is one of a plurality of air-container bodies installed in parallel to said resonator.

6. A gas turbine combustor as described in claim 5, wherein said first throat is one of a plurality of first throats, each of said first throats having one end opening to said internal cavity of said resonator and having another end opening to a respective one of said air-container bodies, and wherein a dividing wall is installed between each of said one ends of said first throats in said internal cavity of said resonator.

7. A gas turbine combustor as described in claim 6, wherein said dividing wall serves as a resistive element having a multiple number of through-holes.

8. A gas turbine, comprising: an air compressor; a gas turbine combustor according to claim 1; and a turbine.

* * * * *